United States Patent
Mishaeli et al.

(10) Patent No.: US 12,253,925 B2
(45) Date of Patent: Mar. 18, 2025

(54) SYSTEMS, APPARATUSES, AND METHODS FOR AUTONOMOUS FUNCTIONAL TESTING OF A PROCESSOR

(71) Applicant: Intel Corporation, Santa Clara, CA (US)

(72) Inventors: Michael Mishaeli, Haifa (IL); Edward Brazil, Leixlip (IE); Bryan J. Gran, Boylston, MA (US); Ohad Itzhaki, Haifa (IL)

(73) Assignee: Intel Corporation, Santa Clara, CA (US)

( * ) Notice: Subject to any disclaimer, the term of this patent is extended or adjusted under 35 U.S.C. 154(b) by 663 days.

(21) Appl. No.: 17/484,542

(22) Filed: Sep. 24, 2021

(65) Prior Publication Data
US 2023/0102991 A1     Mar. 30, 2023

(51) Int. Cl.
| | |
|---|---|
| *G06F 11/22* | (2006.01) |
| *G06F 11/263* | (2006.01) |
| *G06F 11/273* | (2006.01) |

(52) U.S. Cl.
CPC ...... *G06F 11/2236* (2013.01); *G06F 11/2252* (2013.01); *G06F 11/263* (2013.01); *G06F 11/273* (2013.01)

(58) Field of Classification Search
CPC ............. G06F 11/2236; G06F 11/2252; G06F 11/263; G06F 11/273
See application file for complete search history.

(56) References Cited

U.S. PATENT DOCUMENTS

| | | | |
|---|---|---|---|
| 7,197,670 B2 | 3/2007 | Boatright et al. | |
| 9,612,930 B2 | 4/2017 | Shanbhogue et al. | |
| 10,775,434 B2 | 9/2020 | Mishaeli et al. | |
| 2005/0086566 A1* | 4/2005 | Thompson | G06F 11/261 |
| | | | 714/E11.167 |
| 2016/0378628 A1 | 12/2016 | Nguyen et al. | |

(Continued)

OTHER PUBLICATIONS

European Search Report and Search Opinion, EP App. No. 22188906. 6, Feb. 15, 2023, 8 pages.

*Primary Examiner* — Jigar P Patel
(74) *Attorney, Agent, or Firm* — NICHOLSON DE VOS WEBSTER & ELLIOTT LLP

(57) ABSTRACT

Systems, methods, and apparatuses for autonomous functional testing of a processor are described. In one example, a processor includes a plurality of processor cores that are each coupled to a respective power management agent circuit; a cache shared by the plurality of processor cores; and a control register, that when set, causes: a save of a state of a first processor core of the plurality of processor cores to storage, a transfer of control of the first processor core to a power management agent circuit of the first processor core, isolation of the first processor core from the other of the plurality of processor cores by the power management agent circuit, performance of one or more functional tests from the cache on the first processor core caused by the power management agent circuit to generate a test result, removal of the isolation of the first processor core from the other of the plurality of processor cores by the power management agent circuit, and a transfer of the control by the power management agent circuit back to the first processor core.

24 Claims, 19 Drawing Sheets

(56) References Cited

U.S. PATENT DOCUMENTS

2017/0160338 A1    6/2017  Connor et al.
2018/0067515 A1*  3/2018  Jain .......................... G06F 1/12
2018/0095802 A1    4/2018  Nguyen et al.
2018/0336111 A1*  11/2018  Gendler ................ G06F 1/3287
2019/0050309 A1    2/2019  Smith et al.

* cited by examiner

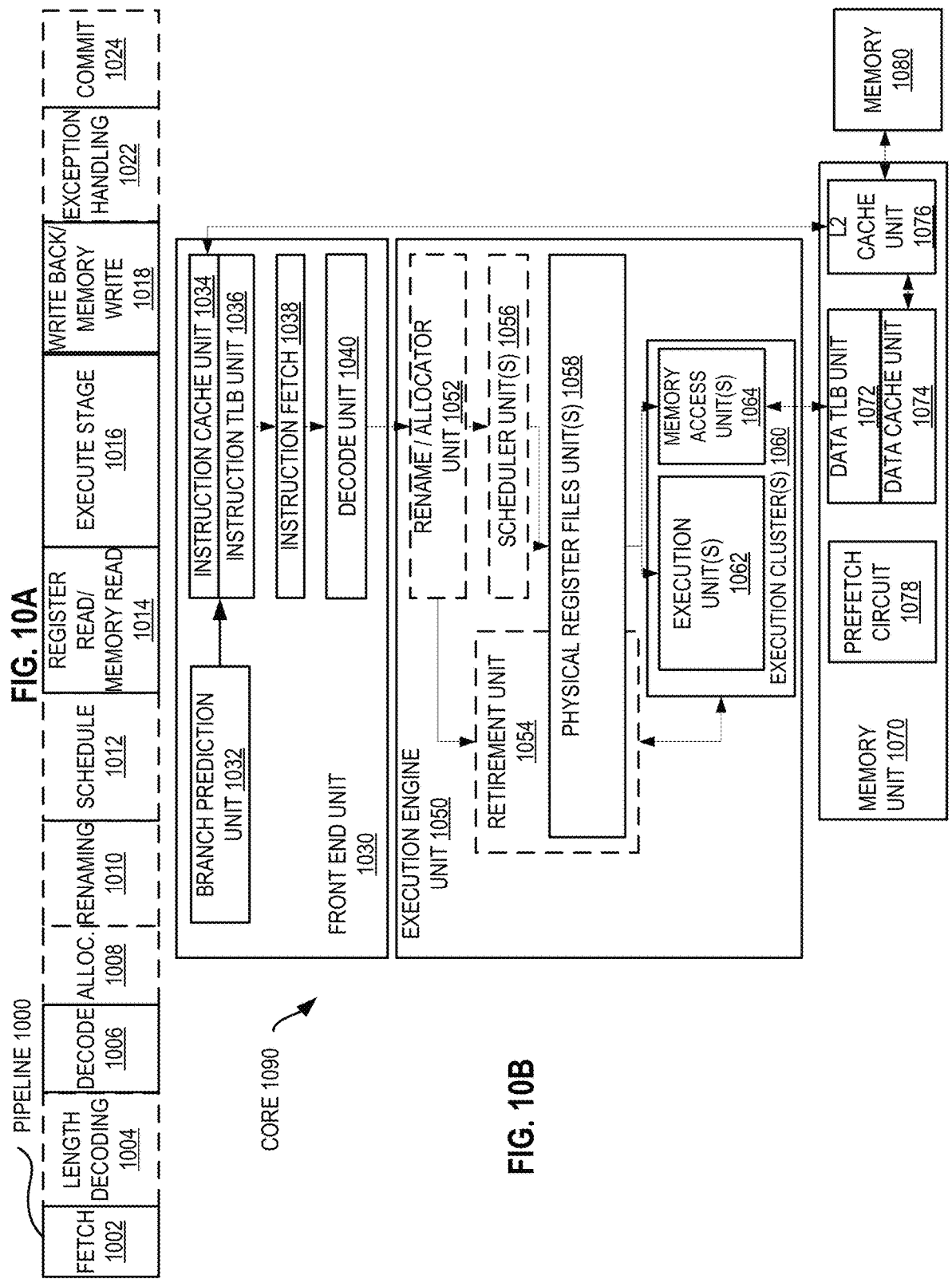

SYSTEMS, APPARATUSES, AND METHODS FOR AUTONOMOUS FUNCTIONAL TESTING OF A PROCESSOR

TECHNICAL FIELD

The disclosure relates generally to computer processor architecture, and, more specifically, to circuitry to implement autonomous functional testing of a processor.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 10A is a block diagram illustrating both an exemplary in-order pipeline and an exemplary register renaming, out-of-order issue/execution pipeline according to examples of the disclosure.

FIG. 10B is a block diagram illustrating both an exemplary example of an in-order architecture core and an exemplary register renaming, out-of-order issue/execution architecture core to be included in a processor according to examples of the disclosure.

DETAILED DESCRIPTION

Figure 1:
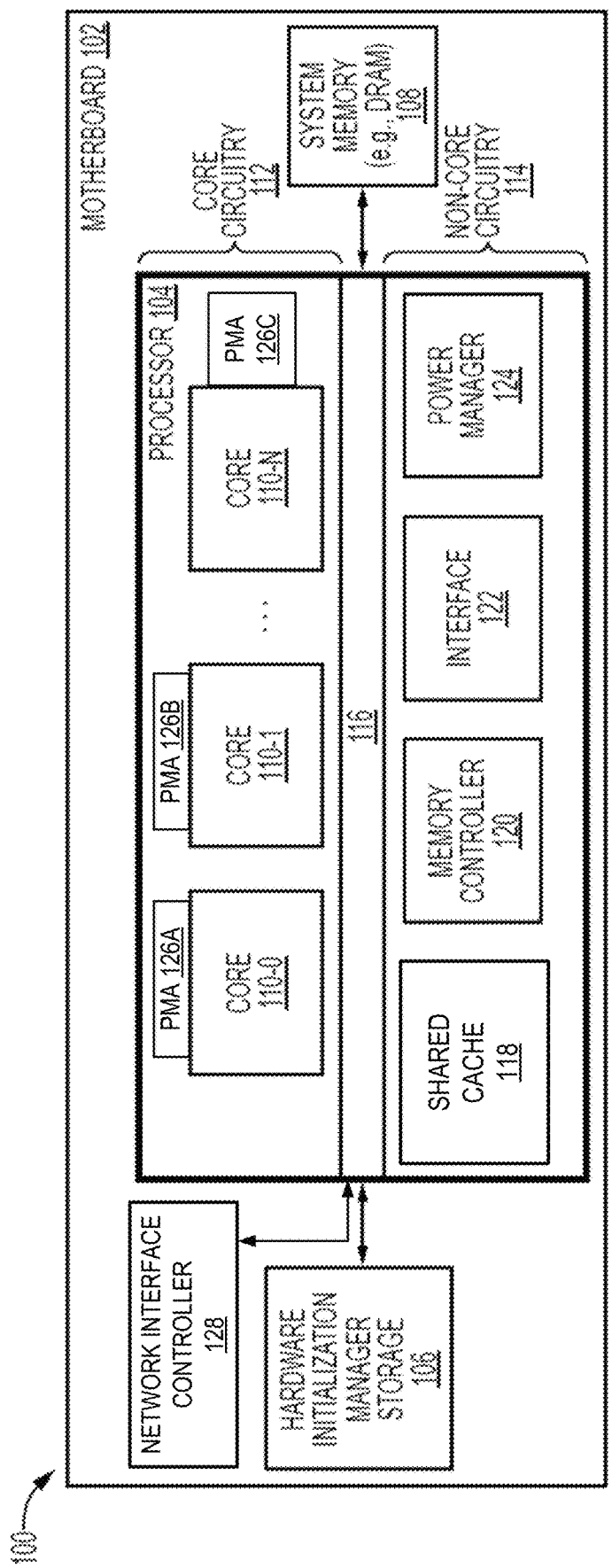
FIG. 1 illustrates a system including a motherboard with a hardware processor according to examples of the disclosure.

In the following description, numerous specific details are set forth. However, it is understood that examples of the disclosure may be practiced without these specific details. In other instances, well-known circuits, structures, and techniques have not been shown in detail in order not to obscure the understanding of this description.

References in the specification to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request.

Hardware resiliency is foundational to reducing the impact of silent data error (SDE) on large scale (e.g., datacenter) hardware infrastructure. There is a desire to self-check a processor (e.g., core) periodically or on-demand at an end-customer site, e.g., at-field. During different stages in the lifetime of a processor (e.g., central processing unit (CPU)) it can become defective (for example, at time-0, infant-mortality (IM), early-life (EL), aging, etc.) and propagate errors across the processor. In certain examples, infant mortality is a term used to describe device failures that occur within the first year of usage. In certain examples, device failures are most often caused by latent manufacturing defects (hereinafter referred to as "hard defects") that escape detection during factory tests and become permanently active during use of the device typically rendering the device as incorrectly functioning. In certain examples, device failures in devices are controlled through a pre-shipment process of burn in. For example, where during the burn-in process, devices are operated at artificially elevated voltages and temperatures for a period of time so as to accelerate and detect defects prior to device shipment that would otherwise affect customers, e.g., early in the life of the device. As transistor dimensions and threshold voltages are scaled down for performance, burn in power and consequently burn in hardware costs increase. This remains an issue as manufacturers struggle to meet market expectations of device failures rates while maintaining reasonable manufacturing costs.

In certain examples, a processor's failure at-field (e.g., in the possession of the end user) is due to (1) insufficient manufacturing screening that leads to time-0 defective parts, (2) IM/EL defects that occurred at the customer site, and (3) aging due to wear out earlier than a warranty provided. In certain examples, purely software-based solutions are used to detect defects (e.g., as potential device failures), however these take an extremely long time to run (e.g., hours) at the customer-site and sometimes may even crash the device (e.g., system), for example, where these techniques are attempts to retrofit software to detect hardware defects. Examples herein overcome these problems by providing a more robust and effective screening solution for defective processors (e.g., CPUs) at-field. In certain examples, a processor (or system-on-a-chip (SoC)) is configured for in-field (e.g., at-field) self-testing so that such testing can be performed in a processor (e.g., a core) in an autonomous manner. In certain examples (e.g., in normal field operation), a processor is configured to perform functional testing of its internal circuitry without any connection to external test circuitry such as external probe testers, manufacturing testers or so forth. In certain examples, a processor includes a plurality of processor cores that are each coupled to a respective power management agent circuit; a cache shared by the plurality of processor cores; and a control register, that when set, causes: a save of a state of a first processor core of the plurality of processor cores to storage, a transfer of control of the first processor core to a power management agent circuit of the first processor core, isolation of the first processor core from the other of the plurality of processor cores by the power management agent circuit, performance of one or more functional tests (e.g., executed by the "under test" first processor core) from the cache on the first processor core caused by the power management agent circuit to generate a test result, removal of the isolation of the first processor core from the other of the plurality of processor cores by the power management agent circuit, and a transfer of the control by the power management agent circuit back to the first processor core.

In certain examples, the testing disclosed herein does not (or, in other examples, does) include a functional test suite of software, e.g., system health check (SHC), that includes numerous tests that have been developed to detect defects. In certain examples, those tests are written with a self-checking mechanism to be able to flag deviation(s) from the expected computed result. However, such retrofitted software techniques are not based on hardware coverage metrics, which better represent defect mechanisms such as stuck-at and at-speed (e.g., at operating frequency(ies)) hardware faults. In certain examples, when those tests encounter a malfunctioning processor (e.g., core), they crash the processor (e.g., system) due to unexpected behavior. In certain examples, SHC provides at-speed coverage, but (1) the SHC test-suite takes hours to run, (2) SHC test-suite runs in non-isolated mode, so when running on a live-system it may sometimes crash the system, and (3) due to the length and inherent non-deterministic behavior of application level traces, the SHC test-suite cannot be measured against hardware defect metrics such as stuck-at and at-speed, e.g., the most effective in combating SDE. Further it is unknown how much benefit SHC provides in hardware coverage terms to combat defects, e.g., where SHC is an open loop lacking a hardware defect coverage feedback system.

In certain examples, the testing disclosed herein does not (or, in other examples, does) include a scan-at-field (SAF) capability within a processor (e.g., core), e.g., that detects defective core(s) on a server die. In certain examples, scan-at-field is initiated on a per-core (e.g., per hardware core which includes one or more logical cores) basis on a running system via a control register command, e.g., a read-write machine specific register (WRMSR) (e.g., ACTIVATE_SCAN) command. In certain examples, dedicated hardware brings the scan-patterns from external-memory and feeds them into the scan-chains to be checked against an expected signature result, e.g., with no disruption to the rest of the processor (e.g., SOC). In certain examples, due to dynamic capacitance ($C_{dyn}$) challenges with massively parallel scan activity and divergence from functional mode, the scan patterns are run in a slow condition (e.g., low frequency), and thus targeting stuck-at faults only. In certain examples, SAF testing only provides stuck-at coverage and not at-speed coverage. In certain examples, SAF test-content is static and cannot be enhanced to close screening test-holes that exists in the (e.g., high volume manufacturing (HVM)) SCAN-patterns.

In certain examples, the testing disclosed herein does not (or, in other examples, does) (1) rely on validation code (Vcode) and/or power code (Pcode) for full control of the testing flow, (2) run only once at system power-off, and/or (3) rely only on an architectural (e.g., self-checking) signature. In certain examples, the testing disclosed herein does use a scan out signature (e.g., SO-signature).

Examples of testing herein provide for structural based functional testing (SBFT), e.g., SBFT testing mode of one or more testing modes. Certain examples herein use a fault-graded functional test-content and functional test-mode and runs each test in an isolated-mode on a processor (e.g., core) under-test, e.g., with the testing caused by a (e.g., WRMSR (ACTIVATE_SBFT)) instruction. In certain examples, these tests (e.g., functional tests) are pre-loaded into storage, e.g., a cache. In one example, the cache is a middle level cache (MLC), e.g., MLC-SBFT. In certain examples, each test comes with a unique scan out (SO) design for test (DFT) hardware signature (e.g., a collection of compressed logic traces from throughout a core capturing faults) (e.g., "SO-signature") which is checked at the end of the test execution, e.g., checked against the expected result. In certain examples, an error is signaled in the following cases: (1) SO-signature mismatch, (2) a (e.g., EBX) data register is not holding a pre-determined value (e.g., 0xACED) indicating the failure of the self-checking code component of the SBFT test, (3) runaway test which never reached a halt (e.g., HLT) instruction, or (4) any combination thereof.

Certain examples herein utilize (e.g., MLC-SBFT) SBFT tests and processor (e.g., core) SBFT test mode, augment SAF diagnostic-coverage in the processor (e.g., core) (e.g., providing higher stuck-at coverage and at-speed coverage (e.g., to detect a problem that only occurs at a certain frequency)), and/or allowing efficient test-hole-resolution (THR), e.g., in case a time-0 escapee is identified. Certain examples herein utilize a power management agent (PMA) (e.g., of a core) to control one or more portions of the SBFT functionality. Certain examples herein utilize a power management agent (PMA) (e.g., of a core) to handle the voltage/frequency work-point for SBFT-At-Field autonomously (e.g., without processor power manager and/or SoC power unit (Punit) involvement), and thus provides a core based solution. Examples herein thus provide a high quality, autonomous at-speed test capability which complements an SAF scan solution, e.g., to enables users (e.g., customers) to detect defective processor cores during runtime with high quality tests and subsequently contain and repair their systems. In certain examples, one or more of the tests are updated, e.g., by a release sent by the manufacturer.

In certain examples, a requestor (e.g., an operating system (OS) and/or a virtual machine monitor (VMM)) launches and execute the provided functional test-content. In certain examples, this can be done via an ISA interface, for example, via an activate functional testing instruction (e.g., an WRMSR( ) instructions or other dedicated instruction). In certain examples, this functionality is enumerated via an instruction, e.g., a CPUID instruction that writes an indication to a register (e.g., MSR) of the existence of such diagnostic capability.

FIG. 1 illustrates a system 100 including a motherboard 102 with a hardware processor 104 according to examples of the disclosure. Depicted motherboard 102 includes a processor 104 coupled to hardware initialization manager (non-transitory) storage 106 and system memory 108 (e.g., dynamic random-access memory (DRAM)). In one example, the hardware initialization manager (non-transitory) storage 106 stores hardware initialization manager firmware (e.g., or software). In one example, the hardware initialization manager (non-transitory) storage 106 stores Basic Input/Output System (BIOS) firmware. In another example, the hardware initialization manager (non-transitory) storage 106 stores Unified Extensible Firmware Interface (UEFI) firmware. In certain examples (e.g., triggered by the power-on or reboot of a processor), processor 104 executes the hardware initialization manager firmware (e.g., or software) stored in hardware initialization manager (non-transitory) storage 106 to initialize the processor for operation, for example, to begin executing an operating system (OS) and/or initialize the (e.g., hardware) components of system 100.

Figure 2:
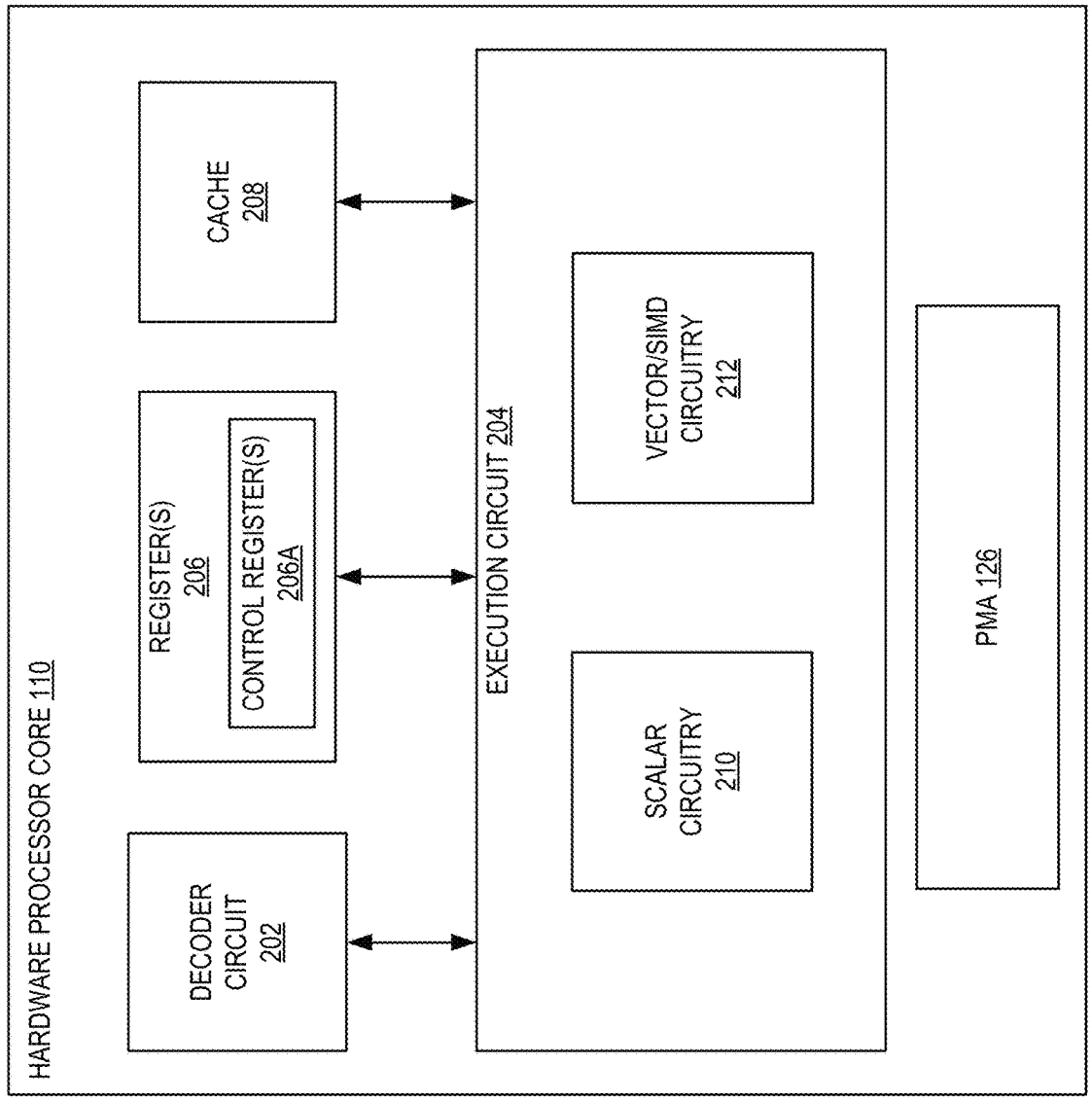
FIG. 2 illustrates a block diagram of a hardware processor core having an execution circuit with scalar circuitry and vector/single instruction, multiple data (SIMD) circuitry according to examples of the disclosure.

Depicted processor 104 is a multicore processor including core circuitry 112 having a plurality of cores 110_0 to 110_N, where N is any integer. In another example, processor only includes a single core. Cores 110_0 to 110_N may be coupled to each other via interconnect 116 or other electrical coupling. Each core may include the components discussed herein, for example, as shown in FIG. 2. Depicted processor 104 includes non-core circuitry 114 separate from outside of) the core circuitry 112. Non-core circuitry 114 may include any combination of shared cache 118 (e.g., a middle and/or last level cache), memory controller 120 (e.g., to maintain cache coherency in caches and/or fetch and retrieve data from system memory 108 or other memory), interface 122. (e.g., to provide a coupling to various components that are not part of processor 104), such as, but not limited to, peripheral devices, mass storage, etc.).

Each core may include its own (e.g., not shared) cache layer inside that core, for example, as shown in FIG. 2. Each core (e.g., and individual components of that core) and/or other components of system 100 may be separately powered, for example, placed into or out of one of multiple power states. In certain examples, each power state is power state according to an Advanced Configuration and Power Interface (ACPI) standard (e.g., the Advanced Configuration and Power Interface (ACPI) Specification Version 6.4 of January 2021). In certain examples, there are core states (c-states) for each core and/or processor (or package) states (p-states) for each processor.

Non-limiting examples of p-states are: P0 Performance State where a device or processor is in this state uses its maximum performance capability and may consume maximum power, P1 Performance State where the performance capability of a device or processor is limited below its maximum (e.g., via lower voltage and/or frequency than P0) and consumes less than maximum power, up to the Pn Performance State where the performance capability of a device or processor is at its minimum level and consumes minimal power while remaining in an active state (e.g., where state n is a maximum number and is processor or device dependent). In certain examples, processors and devices define support for an arbitrary number of performance states (e.g., not to exceed 16).

Non-limiting examples of c-states are: C0 processor core power state (e.g., the operating power state) where while the processor core is an executing power state, C1 processor core power state where the processor core has a hardware latency low enough that the operating software does not consider the latency aspect of the state when deciding whether to use it (e.g., aside from putting the processor in a nonexecuting power state, this state has no other software-visible effects), C2 processor power state that offers improved power savings over the C1 state (e.g., where the worst-case hardware latency for this state is provided via the ACPI system firmware and the operating software can use this information to determine when the C1 state should be used instead of the C2 state and/or aside from putting the processor core in a non-executing power state, this state has no other software-visible effects), C3 processor core power state that offers improved power savings over the C1 and C2 states. (e.g., where the worst-case hardware latency for this state is provided via the ACPI system firmware and the operating software can use this information to determine when the C2 state should be used instead of the C3 state and/or while in the C3 state, the processor's (e.g., core's) caches maintain state but ignore any snoops. For example, where the operating software is responsible for ensuring that the caches maintain coherency. Additional states may be defined by manufacturers for their processors. As one example, a C6 processor core power state may be used wherein the power (e.g., voltage) to the core is shut off, for example, where entry into the C6 state causes the core state (e.g., context information for the core and/or threads operating on that core) to be saved (e.g., to a dedicated C6 storage section in system memory (e.g., static random-access memory (SRAM)) before the core is shut off (e.g., core clocks are stopped and/or core voltage is reduced to zero Volts). As another example, a C7 processor core power state may be used that includes the C6 state changes but also where a last level cache (e.g., shared cache 118) is flushed. In one example, power manager 124 (e.g., circuit) controls the power levels of the components of system 100 (e.g., cores), e.g., according to a power state. In one example, an operating system executing on processor 104 requests the power state changes that are implemented by power manager 124.

In certain examples, processor 104 (e.g., each core thereof) includes a power management agent (PMA), e.g., PMA circuit. For example, with core 110-0 including (e.g., as a component therein) PMA 126A, core 110-1 including (e.g., as a component therein) PMA 126B, core 110-N including (e.g., as a component therein) PMA 126C, shared cache 118 including (e.g., as a component therein) PMA, memory controller 120 including (e.g., as a component therein) PMA, interface 122 including (e.g., as a component therein) PMA, or any combination thereof. In certain examples, a PMA controls power management operations internally to its respective component, e.g., such that PMA 126A only control power management operations of core 110-0, PMA 126B only control power management operations of core 110-1, etc. In certain examples, PMA 130 may interface with a processor-wide power manager 124 (e.g., controller), for example, a power control unit (PCU). In certain examples, a PMA performs certain power management activities for its component (e.g., core) autonomously. In certain examples, a PMA abstracts component (e.g.; core) specific behavior and implements hardware state machines (e.g., finite state machine (FSMs) for all power management control and/or telemetry.

In certain examples, system 100 (e.g., processor 104) implement the testing disclosed herein, e.g., structural based functional testing (SBFT). In certain examples, system 100 (e.g., processor 104) includes circuitry to implement the testing discussed in reference to FIG. 3. Certain examples herein use a fault-graded functional test-content and functional test-mode and runs each test in an isolated-mode on a processor (e.g., core) under-test, e.g., with the testing caused by a (e.g., WRMSR(ACTIVATE_SBFT)) instruction. In certain examples, each core implements the testing disclosed herein via its PMA. In certain examples, the test(s) are stored in storage of system 100, e.g., in system memory 108.

In certain examples, system 100 includes a network interface controller 128 to communicate with another system, e.g., such that updated test(s) are sent to system 100 (e.g., sent to shared cache 118).

FIG. 2 illustrates a block diagram of a hardware processor core 110 having an execution circuit 204 with scalar circuitry 210 and vector/single instruction, multiple data (SIMD) circuitry 212 according to examples of the disclosure. In certain examples, each core in FIG. 1 is an instance of core 110 in FIG. 2. In certain examples, PMA circuit 126 is included within core 110. In certain examples, core 110 is capable of being tested according to the disclosure herein, e.g., according to the operations discussed in reference to FIG. 3. Depicted hardware processor 110 includes a hardware decoder circuit 202 (e.g., decode unit) and a hardware execution circuit 204 (e.g., execution unit). Depicted hardware processor 110 includes (e.g., packed data or vector) register(s) 206. Registers 206 may include one or more of registers to access (e.g., load and/or store) data in, e.g., additionally or alternatively to access (e.g., load or store) of data in another storage (e.g., cache 118 and/or system memory 108 in FIG. 1). In certain examples, core 110 includes control register(s) 206A, e.g., to control the testing disclosed herein. Depicted hardware processor 110 includes cache 208. Cache may include one or more cache banks to access (e.g., load and/or store) data in, e.g., additionally or alternatively to access (e.g., load or store) of data in register(s) 206 or other storage.

Depicted execution circuit 204 includes scalar circuitry 210 and/or vector/single instruction, multiple data (SIMD) circuitry 212. In certain examples, only one or any combination of scalar circuitry 210 and/or vector/single instruction, multiple data (SIMD) circuitry 212 are present (e.g., utilized). In certain examples, scalar circuitry 210 operates on scalar values (e.g., single numbers). In certain examples, vector/SIMD circuitry 212 operates on vector or packed data values.

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

In certain examples, hardware decoder 202 receives an (e.g., single) instruction (e.g., macro-instruction) and decodes the instruction, e.g., into micro-instructions and/or micro-operations. In certain examples, hardware execution circuit 204 executes the decoded instruction (e.g., macro-instruction) to perform an operation or operations. For example, an instruction to be decoded by decoder circuit 202 and for the decoded instruction to be executed by execution circuit 204 may be any instruction discussed herein, e.g., in FIGS. 5-6. In certain examples, testing detects an issue in any of components in FIG. 2, e.g., decoder circuit 202, execution circuit 204, etc.

In certain examples, testing of a processor (e.g., core) uses one or more of three techniques to screen defective parts (e.g., during manufacturing) (1) Array-Built-in Self-test (BIST), (2) Logic-SCAN, and (3) Structural-Based-Functional-Testing (SBFT). Certain examples herein allow for use of one or more of those techniques at-field, e.g., via selecting one or more (e.g., any combination of those) via a respective field in a control register. In certain examples, each core (e.g., each logical core) has its own control register.

Certain examples herein allow for SBFT-testing of a core (e.g., separately on each and every core), e.g., according to SW policy. In certain examples, there are some preliminary steps that microcode performs to prepare the core for the SBFT operation, and then control (e.g., control over what is executed) is handed to hardware (e.g., in the PMA). Certain examples herein securely store the SBFT-test content in memory, e.g., system memory (e.g., system memory 108 in FIG. 1). Examples herein of SBFT are an improvement to Scan-At-Field because these SFBT examples (1) provide additional stuck-at coverage, (2) Scan-At-Field operation is limited to relatively low core frequencies and thus can only aim at stuck-at coverage, while SBFT-At-Field can operate at functional (e.g., all) frequencies and thus provide at-speed coverage, e.g., circuit marginalities, (3) SBFT-at-field can detect performance degradation early, by testing the voltage/frequency (VF) curve throughout the lifetime of a core, e.g., and removing the reliability guard band (RGB) with a controllable offset. Certain examples herein also test with an additional guard band (e.g., voltage threshold) that is above the (e.g., fused in) RGB for diagnostic purpose, e.g., to classify a core which has just consumed its RGB age earlier than expected.

When time-0 defects are discovered, and Fault-Isolation/Failure-Analysis (FI/FA) process is performed to understand the flaw in its screening process, certain examples herein allow new SBFT-tests are written in order to cover the testing-hole (e.g., via THR). In certain examples, those new SBFT-tests can also be shipped to the end-customer in order to detect additional defective parts in the customer fleet. Examples herein thus allow for such improvements, e.g., that are not provided by scan-at-field.

Figure 3:
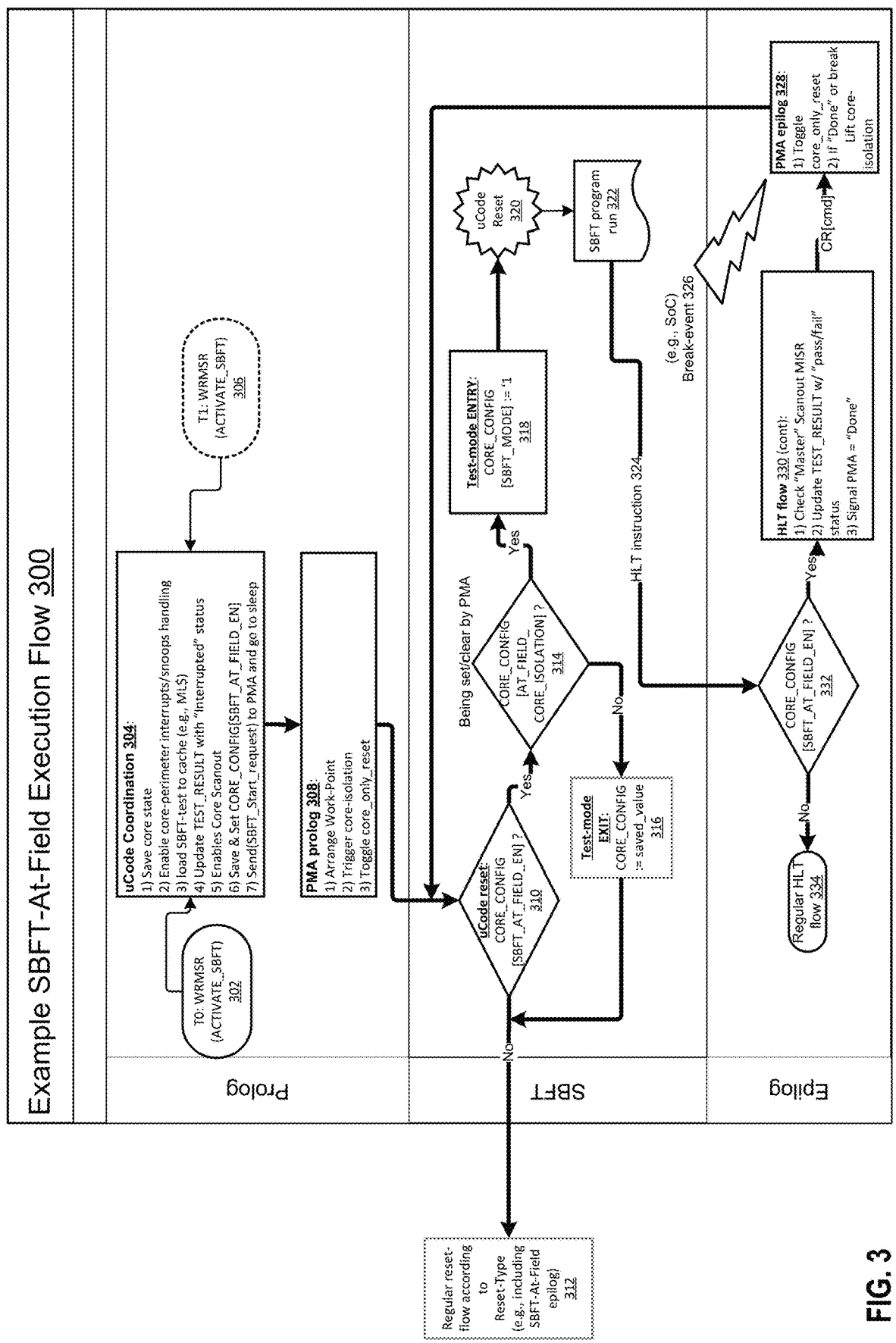
FIG. 3 illustrates a flow diagram for structural based functional testing according to examples of the disclosure.

FIG. 3 illustrates a flow diagram 300 for structural based functional testing according to examples of the disclosure. Depicted flow diagram includes three stages of a SBFT-At-Field operation: (i) prolog, (ii) SBFT testing, and (iii) epilog, and examples for each stage are explained hereafter in more detail.

In certain examples, a request is made to initiate the flow 300, for example, via writing at 302 to a control register, e.g., writing a value to WRMSR that indicates SBFT is to be activated. In certain examples, a processor core is multi-threaded (e.g., via simultaneous multithreading (SMT)), and thus each thread (e.g., of a respective plurality of logical processor cores of a single physical processor core) is to request the same test (e.g., SBFT) or the flow will not proceed. This is shown via (optionally) writing at 306 to a second thread's ("T1") control register, e.g., writing the same value to the WRMSR for T1 as was written to the WRMSR for the first thread ("T0") that indicates SBFT is to be activated. In certain examples, an OS or VMM requests the test, for example, via the write at 302 (e.g., and at 306).

In certain examples (e.g., in response to the write at 302 (e.g., and at 306)), a core that is to be tested executes certain microcode (ucode) at 304 to prepare the core for testing, e.g., as shown. In certain examples, after the microcode is executed, control of the processor core is transferred to that core's PMA, e.g., and the PMA performs its prolog operations at 308.

In certain examples (e.g., in response to the prolog operations completing at 308), the SBFT stage begins. In certain examples, the SBFT stage performs one or more (e.g., functional) tests on the hardware at 322.

In certain examples (e.g., in response to the completion of the tests at 322), the epilog stage begins. In certain examples, the epilog stage ends the flow 300, for example, by performing PMA epilog at 328 (e.g., to transfer control of the processor core from the PMA back to the core. e.g., so the core can resume other program (e.g., code) execution).

In certain examples, the microcode actions at 304 during the prolog include one or more of: (i) where multiple logical processors are running on the same core, the prolog is to synchronize both threads and ensure they provide the same SBFT operands, e.g., indicating what portion of the SBFT test content to run, (ii) saving the (e.g., entire) core state to storage (e.g., C6-RAM), (iii) moving the responsibility to observe and capture interrupts and/or (e.g., cache) snoops from the portions of the core being tested (e.g., transferring this responsibility from the nucleus of the processor core to the core's perimeter) (e.g., where snoops will get an automatic "miss" response and/or interrupts will be logged and handled later, e.g., when the flow 300 transitions to the SBFT stage), (iii) loading the requested SBFT program into storage (e.g., a cache, such as, but not limited to, a mid-level-cache) and/or using the storage (e.g., cache) as a scratchpad (e.g., meaning that the loaded SBFT-program can occupy any address-space it was written towards without interfering with the overall system memory-coherency) (e.g., such that both the SBFT program code and data are being pre-loaded into the cache so once it starts executing the program never misses in that cache), (iv) enabling the core scan out mechanism (e.g., to output the result(s) of the test(s)), (v) setting the configuration for the core to indicate the "SBFT at Field" mode is enabled, and/or (vi) informing the PMA to perform its own prolog and/or put the core-under-test to sleep (e.g., and microcode turns both threads to non-active if multithreaded). In certain examples, the core being put to sleep is logically asleep to the system but is actually under the control of the PMA, e.g., but not under the control of the system.

In certain examples, the PMA SBFT-At-Field prolog at 308 includes one or more of: (i) assigning (e.g., adequate) voltage/frequency work conditions suitable for the known upfront requirements of the MLC-SBFT test that is about to run (e.g., where attributes are passed by microcode), (ii) the core (e.g., nucleus of the core) being electrically isolated from the processor (e.g., SoC), and (iii) the core (e.g., nucleus-core) being sent and receiving a core only reset (e.g., "core_only_reset" command).

In certain examples, if receiving core_only_reset at 310, the core (e.g., nucleus-core) starts to run its microcode-reset flow, and, if microcode detects that the SBFT-At-Field indication (e.g., mode indication) is set at 314, the core performs one of two actions based on whether the "core is being electrically isolated" indication is set: (i) when set, perform the actions related to "entry" flow at 318 and (ii) when cleared, perform the actions related to "exit" flow at 316. In certain examples, a microcode reset occurs at 320 and then the SBFT program (e.g., tests) are run at 322. In certain examples, if the SBFT-At-Field indication (e.g., mode indication) is not set at 310, flow proceeds to "regular" reset flow at 312 according to the reset type. In certain examples, "SBFT_Mode=1" at 318 indicates that the core is configured to run a (e.g., pre-loaded) SBFT test directly from (e.g., mid-level) cache, e.g., and not perform a regular boot of BIOS (or UEFI) as a result of the core reset.

In certain examples, the SBFT program ends with an instruction (e.g., the halt (HLT) instruction) that causes the flow to proceed to the epilog stage. In certain examples herein, a halt (HLT) instruction stops instruction execution and places the processor (e.g., core) in a HALT state (e.g., to stop instruction execution), e.g., and an enabled interrupt (e.g., including a non-maskable interrupt (NMI) or a system-management interrupt (SMI)), a debug exception, a Bus Initialization (BINIT) command, an initialization (INIT) command, or a RESET command will resume execution. In certain examples, if an interrupt (e.g., including NMI) is used to resume execution after a HLT instruction, the saved instruction pointer (e.g., CS:EIP) points to the instruction following the HLT instruction. Certain examples herein modify the behavior of a halt (HLT) instruction, for example, such that at 330 additional operations occur, e.g., (i) checking the "primary" scan out register (e.g., Multiple Input Signature Register (MISR)), (ii) updating the test result (TEST RESULT) with a "pass" or "fail" status, and/or (iii) sending a command to the PMA that the testing is done ("Done").

In certain examples, at the end of the microcode-reset at 320, "entry" flow invokes SBFT at 322 from an address (e.g., 0xFFFFFFF0), e.g., which already resides in the cache.

In certain examples, the SBFT program ends with the halt (HLT) instruction at 324, e.g., which in "SBFT-MODE" also compares the scan out SO-signature MISR to the specific test expected result. In certain examples, the test result(s) (e.g., a pass or fail indication) is stored inside a register that survives the core-only-reset, e.g., the TEST_RESULT survives.

In certain examples, the microcode flow of the HLT instruction, in "SBFT-MODE", sends "Done" indication at 330 to the PMA, e.g., which in turn triggers another core_only_reset and removes the core-isolation (e.g., by the PMA).

In certain examples, the microcode flow of the HLT 324 instruction when not in "SBFT-MODE", performs a regular halt flow at 334 (e.g., as discussed herein), e.g., without the extra operations shown at 330.

In certain examples, after the final core_only_reset, the TEST_RESULT (e.g., Pass/Fail indication) is reported, e.g., to software either via MSR or via machine-check (e.g., exception) signaling.

In certain examples, the PMA monitors the execution of the SBFT program such that if it does not reach the HLT instruction on time (e.g., before reaching a timeout threshold), the PMA finally gives up and marks that the testing as done ("Done").

In certain examples, the PMA performs an epilog at 328 to reset the core to return to the previous execution, and if "done" or a break event 326 (e.g., interrupt) occurred, removes the core isolation.

Figure 4:
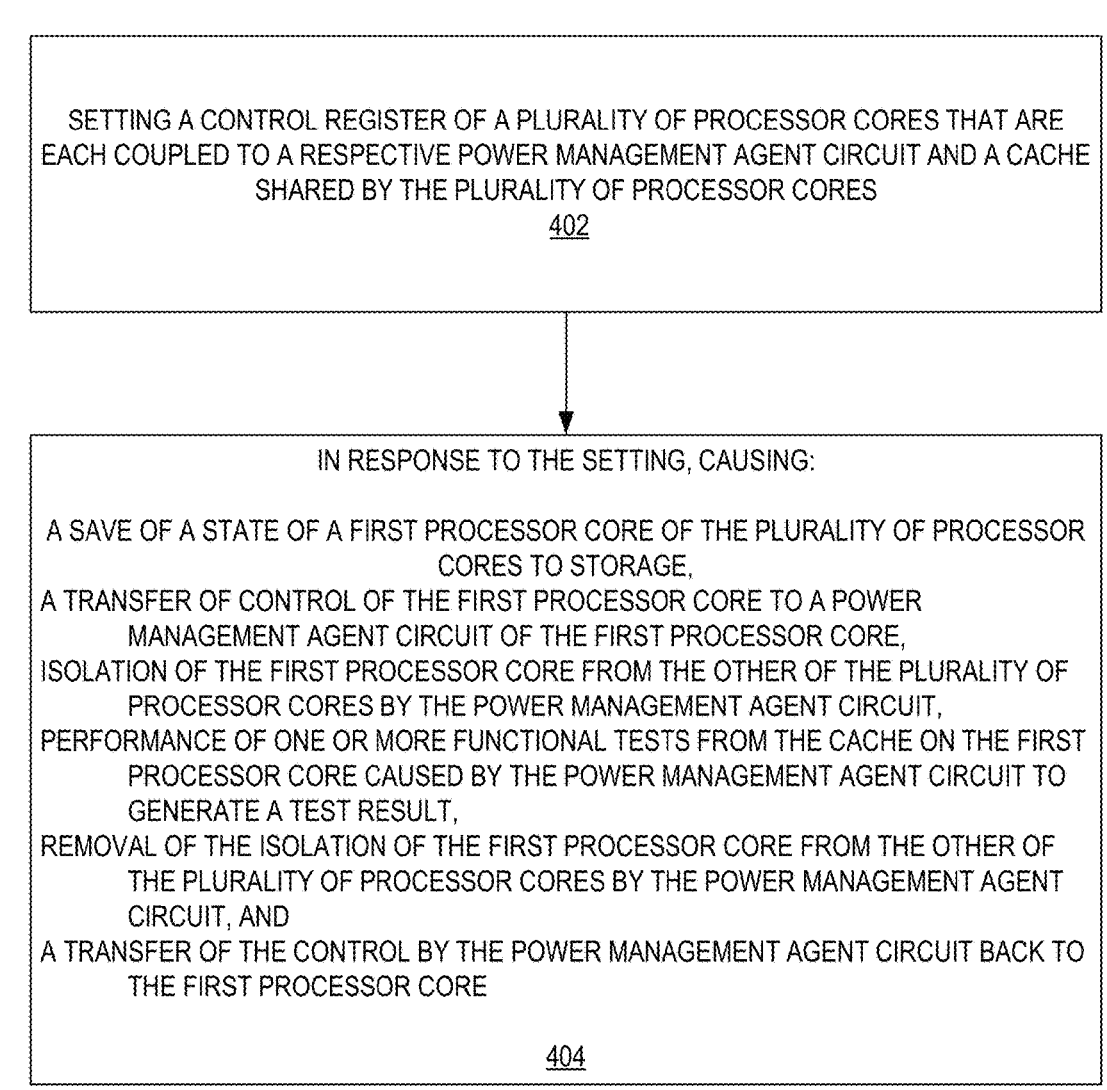
FIG. 4 is a flow diagram illustrating operations for functional testing of a processor core according to examples of the disclosure.

FIG. 4 is a flow diagram illustrating operations 400 for functional testing of a processor core according to examples of the disclosure. Some or all of the operations 400 (or other processes described herein, or variations, and/or combinations thereof) are performed under the control of a core (e.g., processor core 110 with a PMA).

The operations 400 include, at block 402, setting a control register of a plurality of processor cores that are each coupled to a respective power management agent circuit and a cache shared by the plurality of processor cores. The operations 400 further include, at block 404, in response to the setting, causing: a save of a state of a first processor core of the plurality of processor cores to storage, a transfer of control of the first processor core to a power management agent circuit of the first processor core, isolation of the first processor core from the other of the plurality of processor cores by the power management agent circuit, performance of one or more functional tests from the cache on the first processor core caused by the power management agent circuit to generate a test result, removal of the isolation of the first processor core from the other of the plurality of processor cores by the power management agent circuit, and a transfer of the control by the power management agent circuit back to the first processor core.

Figure 5:
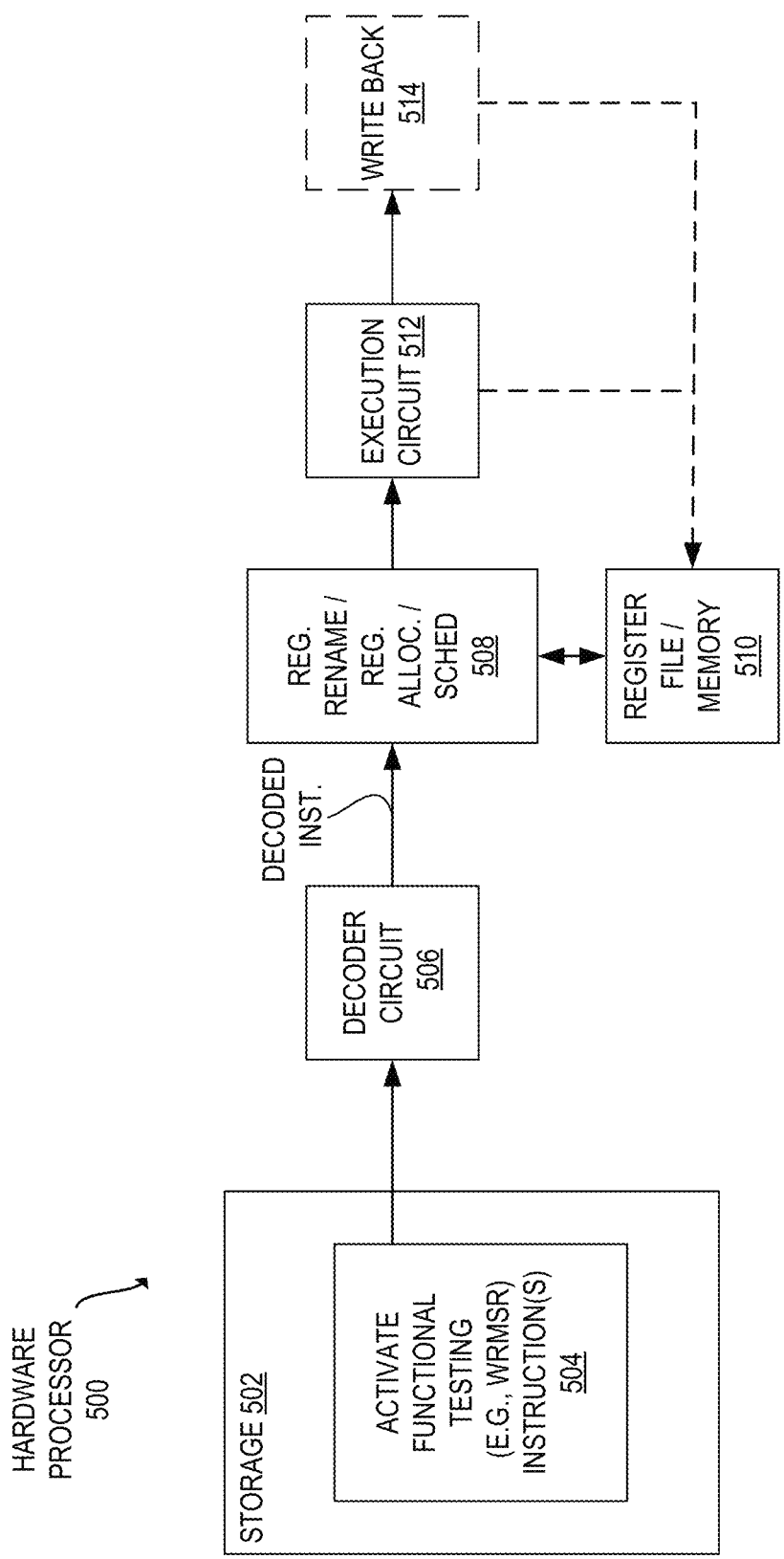
FIG. 5 illustrates a hardware processor coupled to storage that includes one or more activate functional testing instructions according to examples of the disclosure.

FIG. 5 illustrates a hardware processor 500 coupled to storage 502 that includes one or more activate functional testing instructions 504 according to examples of the disclosure.

In certain examples, an activate functional testing instruction is according to any of the disclosure herein. In certain examples, e.g., in response to a request to perform an operation, the instruction (e.g., macro-instruction) is fetched from storage 502 and sent to decoder circuit 506. In the depicted example, the decoder circuit 506 (e.g., decoder circuit) decodes the instruction into a decoded instruction (e.g., one or more micro-instructions or micro-operations). The decoded instruction is then sent for execution, e.g., via scheduler circuit 508 to schedule the decoded instruction for execution.

In certain examples, (e.g., where the processor/core supports out-of-order (OoO) execution), the processor includes a register rename/allocator circuit coupled to register file/memory circuit 510 (e.g., unit) to allocate resources and perform register renaming on registers (e.g., vector registers associated with a logical operation and test instruction). In certain examples, (e.g., for out-of-order execution), the processor includes one or more scheduler circuits 508 coupled to the decoder. The scheduler circuit(s) may schedule one or more operations associated with decoded instructions, including one or more operations decoded from a packed data convolution with shift control and/or width control instruction, for execution on the execution circuit 512.

In certain examples, a write back circuit 514 is included to write back results of an instruction to a destination (e.g., write them to a register(s) and/or memory), for example, so those results are visible within a processor (e.g., visible outside of the execution circuit that produced those results).

One or more of these components (e.g., decoder circuit 506, register rename/register allocator/scheduler 508, execution circuit 512, register file/memory 510, or write back circuit 514) may be in a single core of a hardware processor (e.g., and multiple cores each with an instance of these components).

Figure 6:
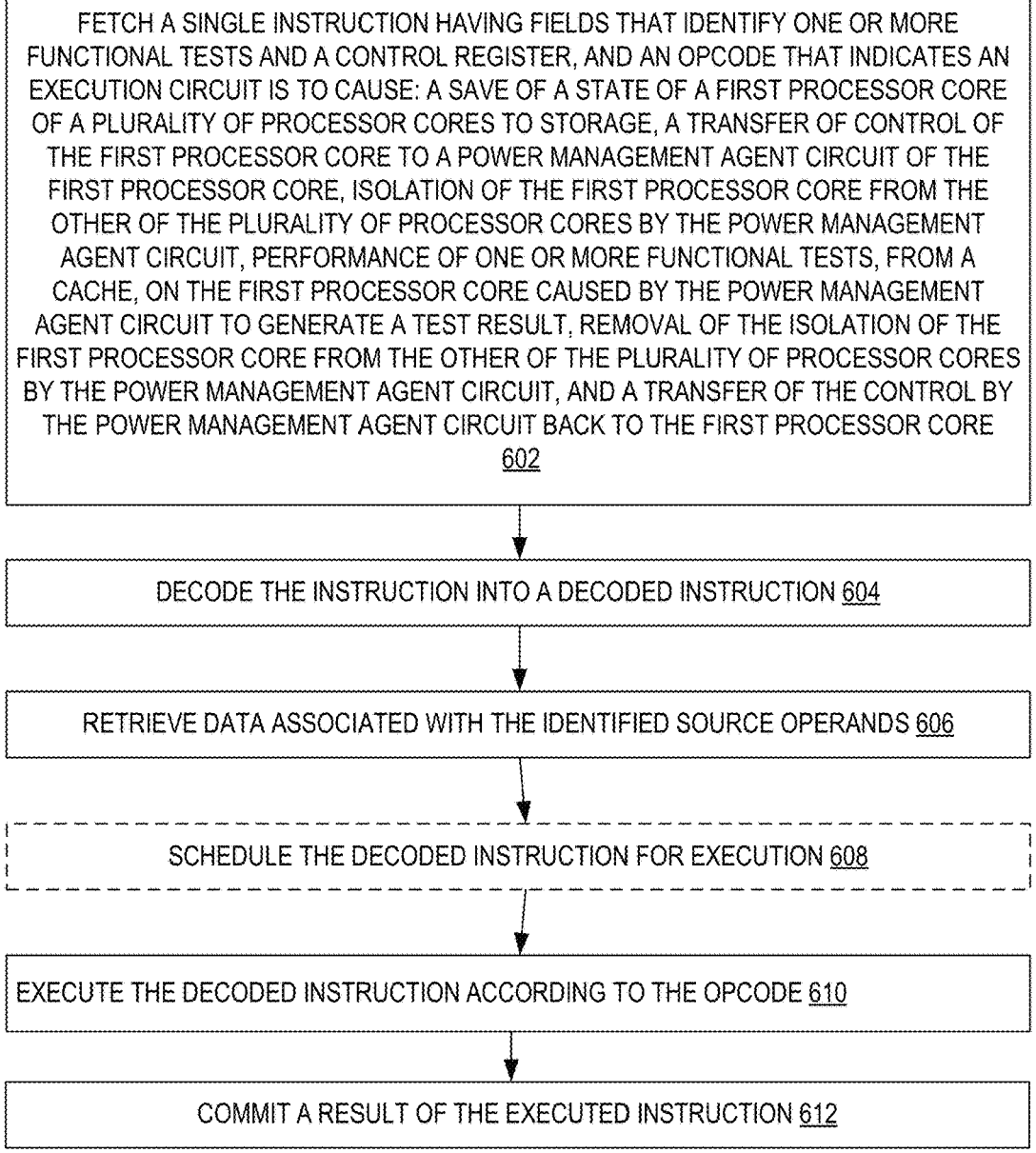
FIG. 6 illustrates a method of processing an activate functional testing instruction according to examples of the disclosure.

FIG. 6 illustrates a method 600 of processing an activate functional testing instruction according to examples of the disclosure. A processor (e.g., or processor core) may perform method 600, e.g., in response to receiving a request to execute an instruction from software. Depicted method 600 includes processing an activate functional testing instruction by: fetch a single instruction having fields that identify one or more functional tests and a control register, and an opcode that indicates an execution circuit is to cause: a save of a state of a first processor core of a plurality of processor cores to storage, a transfer of control of the first processor core to a power management agent circuit of the first processor core, isolation of the first processor core from the other of the plurality of processor cores by the power management agent circuit, performance of one or more functional tests, from a cache, on the first processor core caused by the power management agent circuit to generate a test result, removal of the isolation of the first processor core from the other of the plurality of processor cores by the power management agent circuit, and a transfer of the control by the power management agent circuit back to the first processor core at 602, decode the instruction into a decoded instruction at 604, retrieve data associated with the identified source operands at 606, (optionally) schedule the decoded instruction for execution at 608, execute the decoded instruction according to the opcode at 610, and commit a result of the executed instruction at 612.

Exemplary architectures, systems, etc. that the above may be used in are detailed below. Exemplary instruction formats for the instructions disclosed herein are detailed below.

At least some examples of the disclosed technologies can be described in view of the following:

Example 1. An apparatus comprising:
  a plurality of processor cores that are each coupled to a respective power management agent circuit;
  a cache shared by the plurality of processor cores; and
  a control register, that when set, causes:
    a save of a state of a first processor core of the plurality of processor cores to storage,
    a transfer of control of the first processor core to a power management agent circuit of the first processor core,
    isolation of the first processor core from the other of the plurality of processor cores by the power management agent circuit, performance of one or more functional tests from the cache on the first processor core caused by the power management agent circuit to generate a test result, removal of the isolation of the first processor core from the other of the plurality of processor cores by the power management agent circuit, and a transfer of the control by the power management agent circuit back to the first processor core.

Example 2. The apparatus of example 1, wherein, in response to the control register being set, an interrupt of the first processor core is denied and logged for subsequent handling.

Example 3. The apparatus of example 1, wherein the first processor core comprises:

a decoder circuit to decode a single instruction into a decoded single instruction, the single instruction having fields that identify the one or more functional tests and the control register, and an opcode that indicates an execution circuit is to cause:

the save of the state of the first processor core to the storage, the transfer of control of the first processor core to the power management agent circuit of the first processor core, the isolation of the first processor core from the other of the plurality of processor cores by the power management agent circuit, the performance of the one or more functional tests from the cache on the first processor core by the power management agent circuit to generate the test result, the removal of the isolation of the first processor core from the other of the plurality of processor cores by the power management agent circuit, and the transfer of the control by the power management agent circuit back to the first processor core; and the execution circuit to execute the decoded single instruction according to the opcode.

Example 4. The apparatus of example 1, wherein, in response to the control register being set, the power management agent circuit is to remove a reliability guard band of the first processor core.

Example 5. The apparatus of example 1, wherein the one or more functional tests include an instruction that causes a command to be sent to the power management agent circuit to cause the removal of the isolation and the transfer of the control by the power management agent circuit back to the first processor core.

Example 6. The apparatus of example 1, wherein the one or more functional tests include an instruction that causes a comparison of the test result to a collection of compressed logic traces to determine either of a pass indication and a fail indication for the first processor core.

Example 7. The apparatus of example 1, wherein the first processor core comprises a plurality of logical cores, and the performance of the one or more functional tests from the cache on the first processor core by the power management agent circuit is blocked when the plurality of logical cores do not request a same set of the one or more functional tests.

Example 8. The apparatus of example 1, wherein, in response to the performance of the one or more functional tests not being complete before reaching a timeout threshold, the power management agent circuit is to cause the removal of the isolation of the first processor core from the other of the plurality of processor cores, and the transfer of the control from the power management agent circuit back to the first processor core.

Example 9. A method comprising:

setting a control register of a plurality of processor cores that are each coupled to a respective power management agent circuit and a cache shared by the plurality of processor cores; and in response to the setting, causing:

a save of a state of a first processor core of the plurality of processor cores to storage, a transfer of control of the first processor core to a power management agent circuit of the first processor core, isolation of the first processor core from the other of the plurality of processor cores by the power management agent circuit, performance of one or more functional tests from the cache on the first processor core caused by the power management agent circuit to generate a test result, removal of the isolation of the first processor core from the other of the plurality of processor cores by the power management agent circuit, and a transfer of the control by the power management agent circuit back to the first processor core.

Example 10. The method of example 9, further comprising, in response to the control register being set, denying an interrupt of the first processor core and logging the interrupt for subsequent handling.

Example 11. The method of example 9, further comprising:

decoding, by a decoder circuit of the first processor core, a single instruction into a decoded single instruction, the single instruction having fields that identify the one or more functional tests and the control register, and an opcode that indicates an execution circuit is to cause:

the save of the state of the first processor core to the storage, the transfer of control of the first processor core to the power management agent circuit of the first processor core, the isolation of the first processor core from the other of the plurality of processor cores by the power management agent circuit, the performance of the one or more functional tests from the cache on the first processor core by the power management agent circuit to generate the test result, the removal of the isolation of the first processor core from the other of the plurality of processor cores by the power management agent circuit, and the transfer of the control by the power management agent circuit back to the first processor core; and executing, by the execution circuit of the first processor core, the decoded single instruction according to the opcode.

Example 12. The method of example 9, further comprising removing a reliability guard band of the first processor core by the power management agent circuit in response to the control register being set.

Example 13. The method of example 9, wherein the one or more functional tests include an instruction that causes a command to be sent to the power management agent circuit to cause the removal of the isolation and the transfer of the control by the power management agent circuit back to the first processor core.

Example 14. The method of example 9, wherein the one or more functional tests include an instruction that causes a comparison of the test result to a collection of compressed logic traces to determine either of a pass indication and a fail indication for the first processor core.

Example 15. The method of example 9, wherein the first processor core comprises a plurality of logical cores, and the performance of the one or more functional tests from the cache on the first processor core by the power management agent circuit is blocked when the plurality of logical cores do not request a same set of the one or more functional tests.

Example 16. The method of example 9, further comprising, in response to the performance of the one or more functional tests not being complete before reaching a timeout threshold, causing the removal of the isolation of the first processor core from the other of the plurality of processor cores, and the transfer of the control from the power management agent circuit back to the first processor core.

Example 17. A non-transitory machine readable medium that stores program code that when executed by a machine causes the machine to perform a method comprising:
setting a control register of a plurality of processor cores that are each coupled to a respective power management agent circuit and a cache shared by the plurality of processor cores; and
in response to the setting, causing:
  a save of a state of a first processor core of the plurality of processor cores to storage,
  a transfer of control of the first processor core to a power management agent circuit of the first processor core,
  isolation of the first processor core from the other of the plurality of processor cores by the power management agent circuit,
  performance of one or more functional tests from the cache on the first processor core caused by the power management agent circuit to generate a test result,
  removal of the isolation of the first processor core from the other of the plurality of processor cores by the power management agent circuit, and
  a transfer of the control by the power management agent circuit back to the first processor core.

Example 18. The non-transitory machine readable medium of example 17, wherein the method further comprises, in response to the control register being set, denying an interrupt of the first processor core and logging the interrupt for subsequent handling.

Example 19. The non-transitory machine readable medium of example 17, wherein the method further comprises:
decoding, by a decoder circuit of the first processor core, a single instruction into a decoded single instruction, the single instruction having fields that identify the one or more functional tests and the control register, and an opcode that indicates an execution circuit is to cause:
  the save of the state of the first processor core to the storage,
  the transfer of control of the first processor core to the power management agent circuit of the first processor core,
  the isolation of the first processor core from the other of the plurality of processor cores by the power management agent circuit,
  the performance of the one or more functional tests from the cache on the first processor core by the power management agent circuit to generate the test result,
  the removal of the isolation of the first processor core from the other of the plurality of processor cores by the power management agent circuit, and
  the transfer of the control by the power management agent circuit back to the first processor core; and
executing, by the execution circuit of the first processor core, the decoded single instruction according to the opcode.

Example 20. The non-transitory machine readable medium of example 17, wherein the method further comprises removing a reliability guard band of the first processor core by the power management agent circuit in response to the control register being set.

Example 21. The non-transitory machine readable medium of example 17, wherein the one or more functional tests include an instruction that causes a command to be sent to the power management agent circuit to cause the removal of the isolation and the transfer of the control by the power management agent circuit back to the first processor core.

Example 22. The non-transitory machine readable medium of example 17, wherein the one or more functional tests include an instruction that causes a comparison of the test result to a collection of compressed logic traces to determine either of a pass indication and a fail indication for the first processor core.

Example 23. The non-transitory machine readable medium of example 17, wherein the first processor core comprises a plurality of logical cores, and the performance of the one or more functional tests from the cache on the first processor core by the power management agent circuit is blocked when the plurality of logical cores do not request a same set of the one or more functional tests.

Example 24. The non-transitory machine readable medium of example 17, wherein the method further comprises, in response to the performance of the one or more functional tests not being complete before reaching a timeout threshold, causing the removal of the isolation of the first processor core from the other of the plurality of processor cores, and the transfer of the control from the power management agent circuit back to the first processor core.

In yet another example, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While examples are described in which both vector and scalar operations are supported through the vector friendly instruction format, alternative examples use only vector operations the vector friendly instruction format.

Figure 7A:
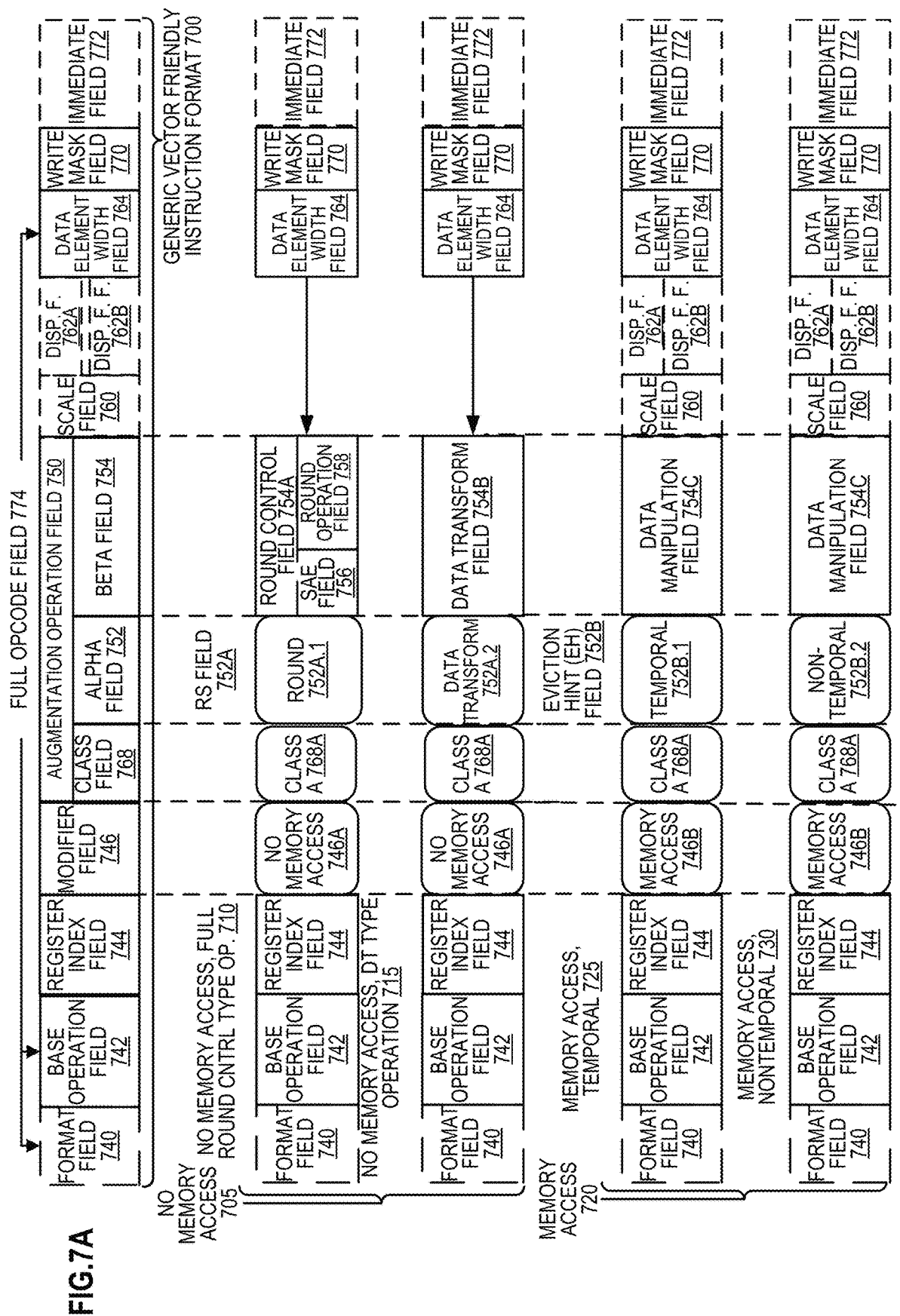
FIG. 7A is a block diagram illustrating a generic vector friendly instruction format and class A instruction templates thereof according to examples of the disclosure.
Figure 7B:
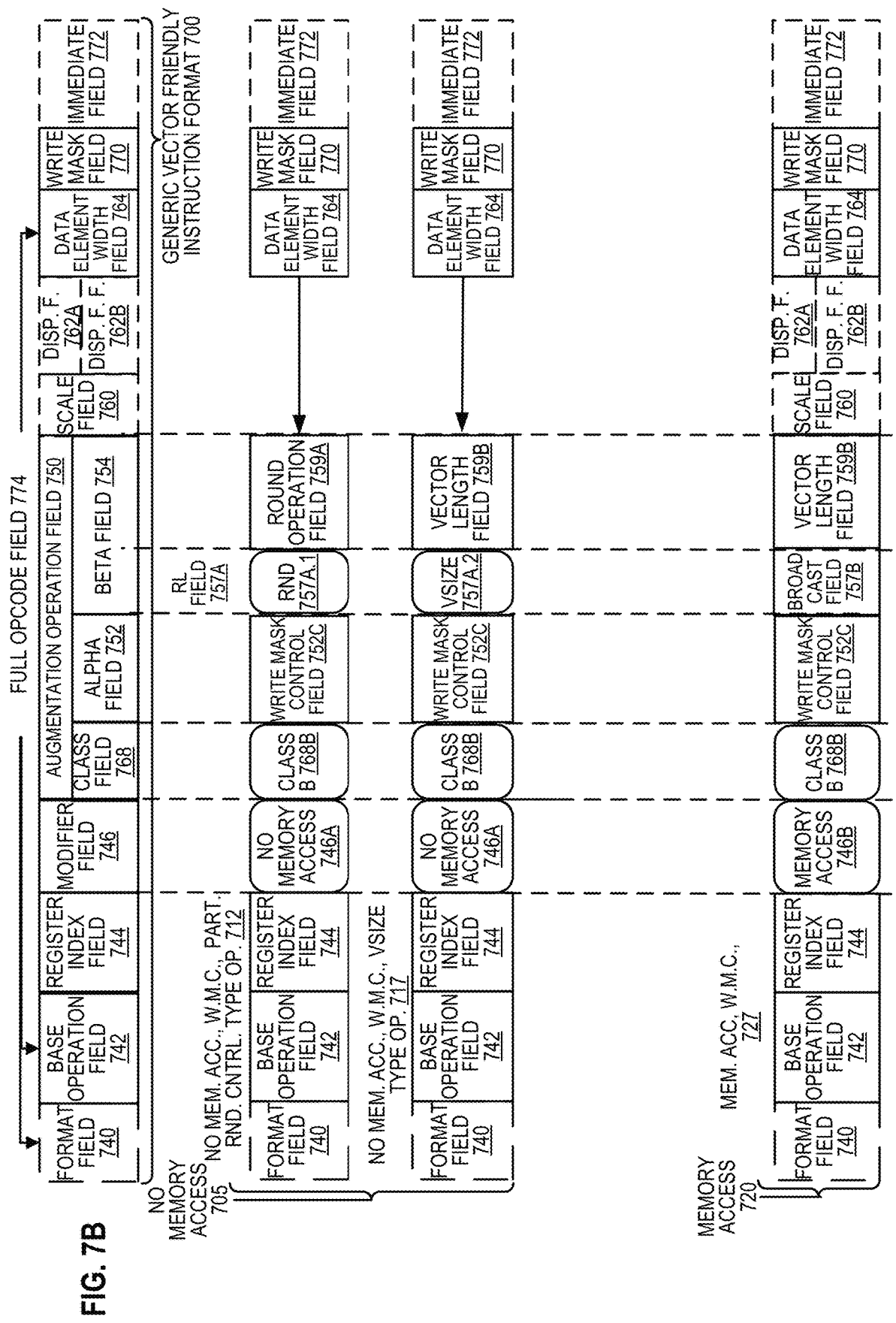
FIG. 7B is a block diagram illustrating the generic vector friendly instruction format and class B instruction templates thereof according to examples of the disclosure.

FIGS. 7A-7B are block diagrams illustrating a generic vector friendly instruction format and instruction templates thereof according to examples of the disclosure. FIG. 7A is a block diagram illustrating a generic vector friendly instruction format and class A instruction templates thereof according to examples of the disclosure; while FIG. 7B is a block diagram illustrating the generic vector friendly instruction format and class B instruction templates thereof according to examples of the disclosure. Specifically, a generic vector friendly instruction format 700 for which are defined class A and class B instruction templates, both of which include no memory access 705 instruction templates and memory access 720 instruction templates. The term generic in the context of the vector friendly instruction format refers to the instruction format not being tied to any specific instruction set.

While examples of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative examples may support more, less and/or different vector operand sizes (e.g., 256 byte vector operands) with more, less, or different data element widths (e.g., 128 bit (16 byte) data element widths).

The class A instruction templates in FIG. 7A include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, non-temporal 730 instruction template. The class B instruction templates in FIG. 7B include: 1) within the no memory access 705 instruction templates there is shown a no memory access, write mask control, partial round control type operation 712 instruction template and a no memory access, write mask control, vsize type operation 717 instruction template; and 2) within the memory access 720 instruction templates there is shown a memory access, write mask control 727 instruction template.

The generic vector friendly instruction format 700 includes the following fields listed below in the order illustrated in FIGS. 7A-7B.

Format field 740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 742—its content distinguishes different base operations.

Register index field 744—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in one example N may be up to three sources and one destination register, alternative examples may support more or less sources and destination registers (e.g., may support up to two sources where one of these sources also acts as the destination, may support up to three sources where one of these sources also acts as the destination, may support up to two sources and one destination).

Modifier field 746—its content distinguishes occurrences of instructions in the generic vector instruction format that specify memory access from those that do not; that is, between no memory access 705 instruction templates and memory access 720 instruction templates. Memory access operations read and/or write to the memory hierarchy (in some cases specifying the source and/or destination addresses using values in registers), while non-memory access operations do not (e.g., the source and destinations are registers). While in one example this field also selects between three different ways to perform memory address calculations, alternative examples may support more, less, or different ways to perform memory address calculations.

Augmentation operation field 750—its content distinguishes which one of a variety of different operations to be performed in addition to the base operation. This field is context specific. In one example of the disclosure, this field is divided into a class field 768, an alpha field 752, and a beta field 754. The augmentation operation field 750 allows common groups of operations to be performed in a single instruction rather than 2, 3, or 4 instructions.

Scale field 760—its content allows for the scaling of the index field's content for memory address generation (e.g., for address generation that uses $2^{scale}*\text{index}+\text{base}$).

Displacement Field 762A—its content is used as part of memory address generation (e.g., for address generation that uses $2^{scale}*\text{index}+\text{base}+\text{displacement}$).

Displacement Factor Field 762B (note that the juxtaposition of displacement field 762A directly over displacement factor field 762B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different examples may implement only one or none of the two.

Data element width field 764—its content distinguishes which one of a number of data element widths is to be used (in some examples for all instructions; in other examples for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While examples of the disclosure are described in which the write mask field's 770 content selects one of a number of write mask registers that contains the write mask to be used (and thus the write mask field's 770 content indirectly identifies that masking to be performed), alternative examples instead or additional allow the mask write field's 770 content to directly specify the masking to be performed.

Immediate field 772—its content allows for the specification of an immediate. This field is optional in the sense that is it not present in an implementation of the generic vector friendly format that does not support immediate and it is not present in instructions that do not use an immediate.

Class field 768—its content distinguishes between different classes of instructions. With reference to FIGS. 7A-B, the contents of this field select between class A and class B instructions. In FIGS. 7A-B, rounded corner squares are used to indicate a specific value is present in a field (e.g., class A 768A and class B 768B for the class field 768 respectively in FIGS. 7A-B).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed. In the no memory access 705 instruction templates, the scale field 760, the displacement field 762A, and the displacement scale filed 762B are not present.

No-Memory Access Instruction Templates—Full Round Control Type Operation

In the no memory access full round control type operation 710 instruction template, the beta field 754 is interpreted as a round control field 754A, whose content(s) provide static rounding. While in the described examples of the disclosure the round control field 754A includes a suppress all floating-point exceptions (SAE) field 756 and a round operation control field 758, alternative examples may support may encode both these concepts into the same field or only have one or the other of these concepts/fields (e.g., may have only the round operation control field 758).

SAE field 756—its content distinguishes whether or not to disable the exception event reporting; when the SAE field's 756 content indicates suppression is enabled, a given instruction does not report any kind of floating-point exception flag and does not raise any floating-point exception handler.

Round operation control field 758—its content distinguishes which one of a group of rounding operations to perform (e.g., Round-up, Round-down, Round-towards-zero and Round-to-nearest). Thus, the round operation control field 758 allows for the changing of the rounding mode on a per instruction basis. In one example of the disclosure where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7A, temporal 752B.1 and non-temporal 752B.2 are respectively specified for the memory access, temporal 725 instruction template and the memory access, non-temporal 730 instruction template), while the beta field 754 is interpreted as a data manipulation field 754C, whose content distinguishes which one of a number of data manipulation operations (also known as primitives) is to be performed (e.g., no manipulation; broadcast; up conversion of a source; and down conversion of a destination). The memory access 720 instruction templates include the scale field 760, and optionally the displacement field 762A or the displacement scale field 762B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement scale filed 762B are not present.

In the no memory access, write mask control, partial round control type operation 710 instruction template, the rest of the beta field 754 is interpreted as a round operation field 759A and exception event reporting is disabled (a given instruction does not report any kind of floating-point exception flag and does not raise any floating-point exception handler).

Round operation control field 759A—just as round operation control field 758, its content distinguishes which one of a group of rounding operations to perform (e.g., Round-up, Round-down, Round-towards-zero and Round-to-nearest). Thus, the round operation control field 759A allows for the changing of the rounding mode on a per instruction basis. In one example of the disclosure where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted the vector length field 759B. The memory access 720 instruction templates include the scale field 760, and optionally the displacement field 762A or the displacement scale field 762B.

With regard to the generic vector friendly instruction format 700, a full opcode field 774 is shown including the format field 740, the base operation field 742, and the data element width field 764. While one example is shown where the full opcode field 774 includes all of these fields, the full opcode field 774 includes less than all of these fields in examples that do not support all of them. The full opcode field 774 provides the operation code (opcode).

The augmentation operation field 750, the data element width field 764, and the write mask field 770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some examples of the disclosure, different processors or different cores within a processor may support only class A, only class B, or both classes. For instance, a high-performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high-performance general-purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different examples of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 8 is a block diagram illustrating an exemplary specific vector friendly instruction format according to examples of the disclosure. FIG. 8 shows a specific vector friendly instruction format 800 that is specific in the sense that it specifies the location, size, interpretation, and order of the fields, as well as values for some of those fields. The specific vector friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 7 into which the fields from FIG. 8 map are illustrated.

It should be understood that, although examples of the disclosure are described with reference to the specific vector friendly instruction format 800 in the context of the generic vector friendly instruction format 700 for illustrative purposes, the disclosure is not limited to the specific vector friendly instruction format 800 except where claimed. For example, the generic vector friendly instruction format 700 contemplates a variety of possible sizes for the various fields, while the specific vector friendly instruction format 800 is shown as having fields of specific sizes. By way of specific example, while the data element width field 764 is illustrated as a one bit field in the specific vector friendly instruction format 800, the disclosure is not so limited (that is, the generic vector friendly instruction format 700 contemplates other sizes of the data element width field 764).

Figure 8A:
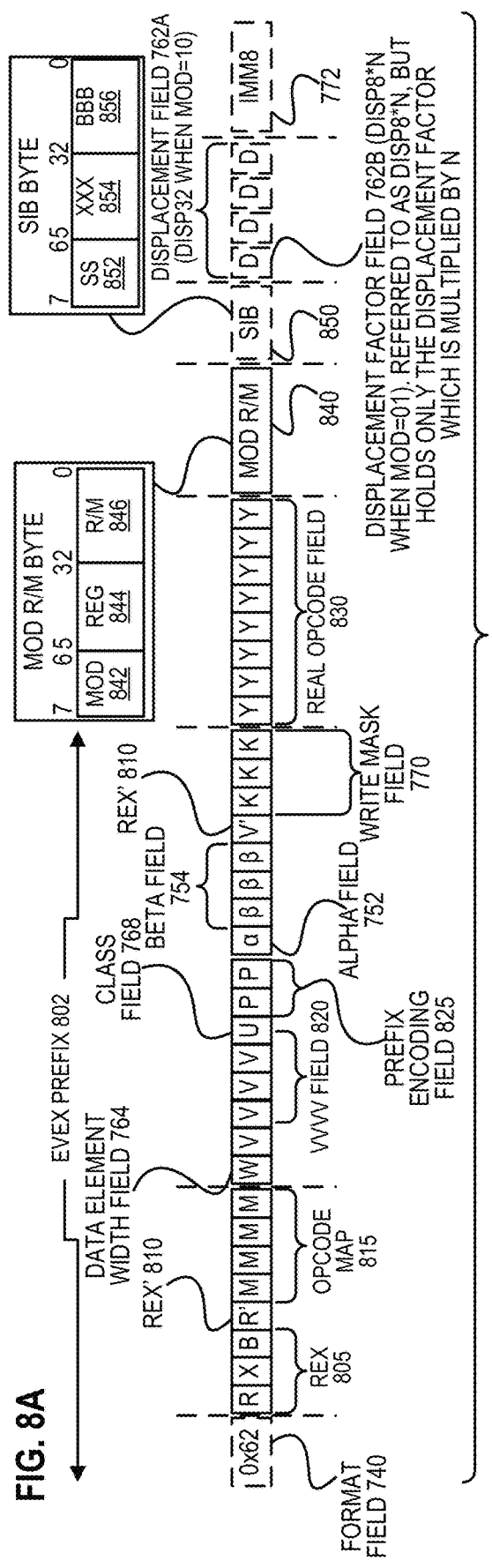
FIG. 8A is a block diagram illustrating fields for the generic vector friendly instruction formats in FIGS. 7A and 7B according to examples of the disclosure.

The generic vector friendly instruction format 700 includes the following fields listed below in the order illustrated in FIG. 8A.

EVEX Prefix (Bytes 0-3) 802—is encoded in a four-byte form.

Format Field 740 (EVEX Byte 0, bits [7:0])—the first byte (EVEX Byte 0) is the format field 740 and it contains 0x62 (the unique value used for distinguishing the vector friendly instruction format in one example of the disclosure).

The second-fourth bytes (EVEX Bytes 1-3) include a number of bit fields providing specific capability.

REX field 805 (EVEX Byte 1, bits [7-5])—consists of a EVEX.R bit field (EVEX Byte 1, bit [7]—R), EVEX.X bit field (EVEX byte 1, bit [6]—X), and 757BEX byte 1, bit[5]—B). The EVEX.R, EVEX.X, and EVEX.B bit fields provide the same functionality as the corresponding VEX bit fields, and are encoded using 1s complement form, e.g., ZMM0 is encoded as 1111B, ZM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710—this is the first part of the REX' field 710 and is the EVEX.R' bit field (EVEX Byte 1, bit [4]—R') that is used to encode either the upper 16 or lower 16 of the extended 32 register set. In one example of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative examples of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 815 (EVEX byte 1, bits [3:0]—mmmm)—its content encodes an implied leading opcode byte (0F, 0F 38, or 0F 3).

Data element width field 764 (EVEX byte 2, bit [7]—W)—is represented by the notation EVEX.W. EVEX.W is used to define the granularity (size) of the datatype (either 32-bit data elements or 64-bit data elements).

EVEX.vvvv 820 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 820 encodes the 4 low-order bits of the first source register specifier stored in inverted (1s complement) form. Depending on the instruction, an extra different EVEX bit field is used to extend the specifier size to 32 registers.

EVEX.U 768 Class field (EVEX byte 2, bit [2]-U)—If EVEX.0=0, it indicates class A or EVEX.U0; if EVEX.0=1, it indicates class B or EVEX.U1.

Prefix encoding field 825 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one example, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain examples expand in a similar fashion for consistency but allow for different meanings to be specified by these legacy SIMD prefixes. An alternative example may redesign the PLA to support the 2 bit SIMD prefix encodings, and thus not require the expansion.

Alpha field 752 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 754 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 710—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]-kkk)—its content specifies the index of a register in the write mask registers as previously described. In one example of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand, or be treated as an opcode extension and not used to encode any instruction operand. The role of R/M field 846 may include the following: encoding the instruction operand that references a memory address, or encoding either the destination register operand or a source register operand.

Scale, Index, Base (SIB) Byte (Byte 6)—As previously described, the scale field's 750 content is used for memory address generation. SIB.xxx 854 and SIB.bbb 856—the contents of these fields have been previously referred to with regard to the register indexes Xxxx and Bbbb.

Displacement field 762A (Bytes 7-10)—when MOD field 842 contains 10, bytes 7-10 are the displacement field 762A, and it works the same as the legacy 32-bit displacement (disp32) and works at byte granularity.

Displacement factor field 762B (Byte 7)—when MOD field 842 contains 01, byte 7 is the displacement factor field 762B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 762B is a reinterpretation of disp8; when using displacement factor field 762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 772 operates as previously described.

Full Opcode Field

Figure 8B:
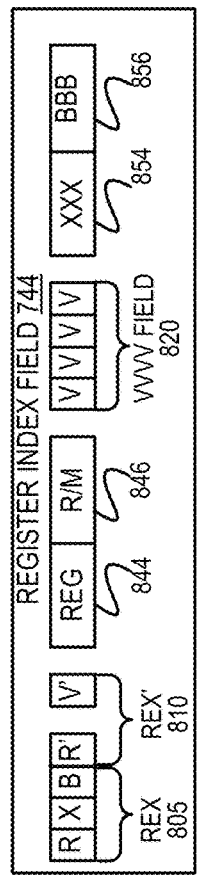
FIG. 8B is a block diagram illustrating the fields of the specific vector friendly instruction format in FIG. 8A that make up a full opcode field according to one example of the disclosure.

FIG. 8B is a block diagram illustrating the fields of the specific vector friendly instruction format 800 that make up the full opcode field 774 according to one example of the disclosure. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

Figure 8C:
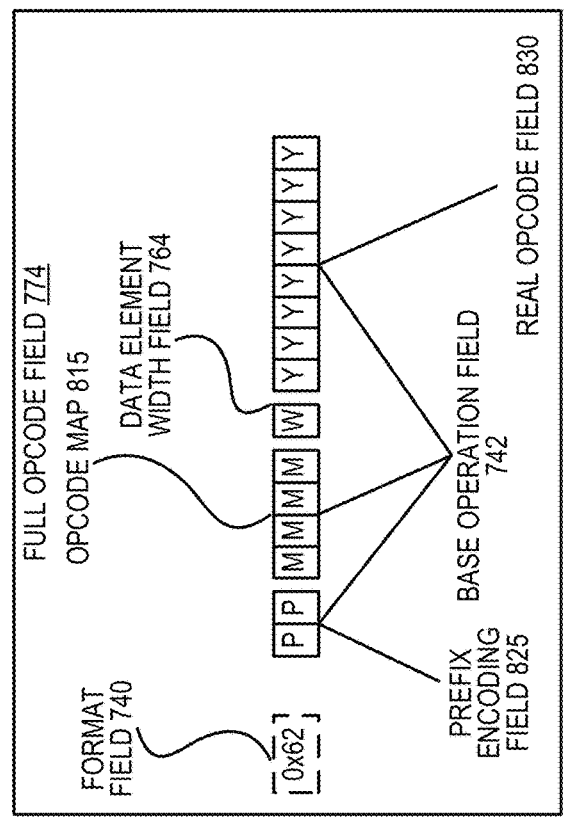
FIG. 8C is a block diagram illustrating the fields of the specific vector friendly instruction format in FIG. 8A that make up a register index field according to one example of the disclosure.

FIG. 8C is a block diagram illustrating the fields of the specific vector friendly instruction format 800 that make up the register index field 744 according to one example of the disclosure. Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
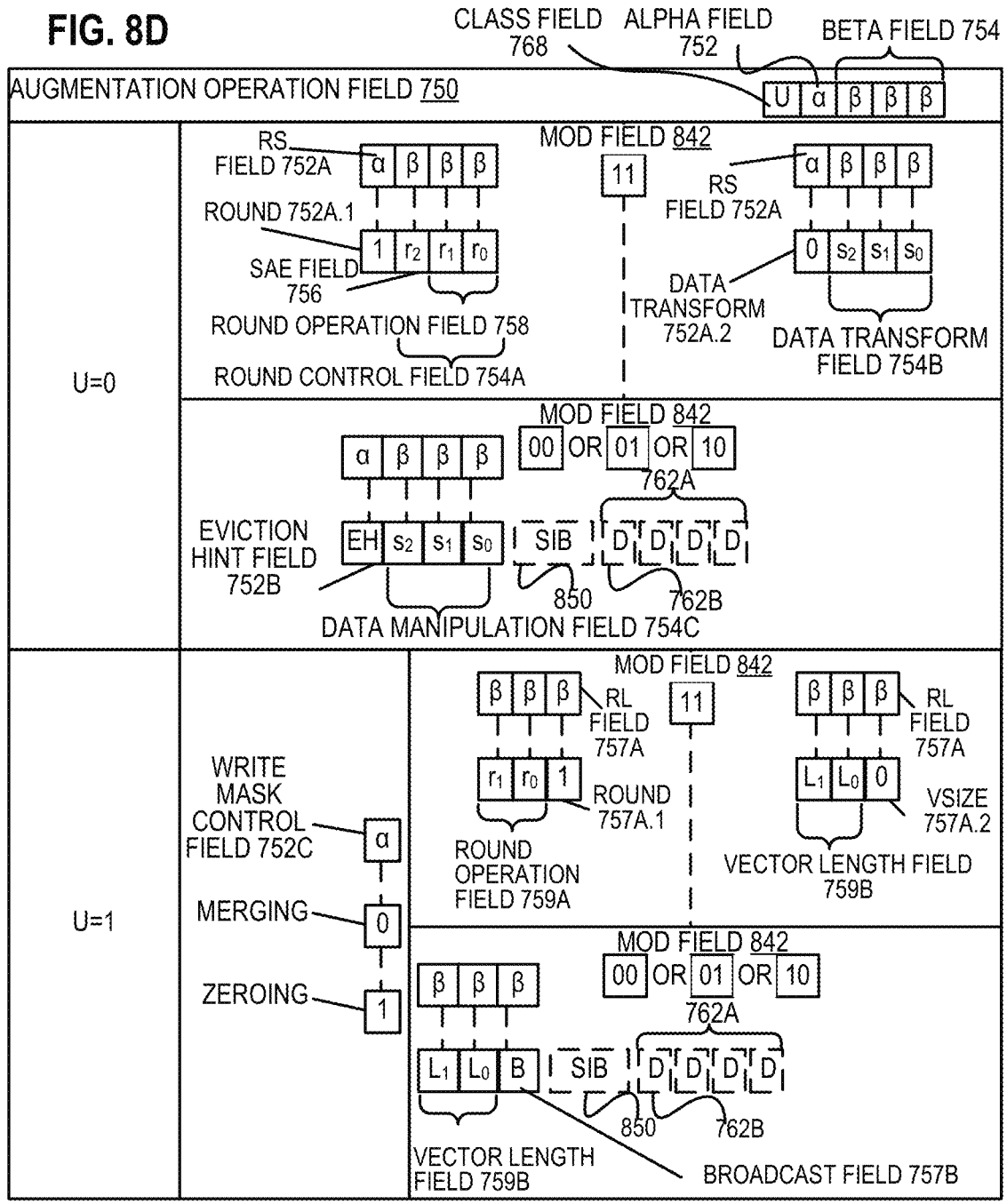
FIG. 8D is a block diagram illustrating the fields of the specific vector friendly instruction format in FIG. 8A that make up the augmentation operation field 750 according to one example of the disclosure.

FIG. 8D is a block diagram illustrating the fields of the specific vector friendly instruction format 800 that make up the augmentation operation field 750 according to one example of the disclosure. When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]—EH) is interpreted as the rs field 752A. When the rs field 752A contains a 1 (round 752A.1), the beta field 754 (EVEX byte 3, bits [6:4]—SSS) is interpreted as the round control field 754A. The round control field 754A includes a one bit SAE field 756 and a two bit round operation field 758. When the rs field 752A contains a 0 (data transform 752A.2), the beta field 754 (EVEX byte 3, bits [6:4]—SSS) is interpreted as a three bit data transform field 754B. When U=0 and the MOD field 842 contains 00, 01, or 10 (signifying a memory access operation), the alpha field 752 (EVEX byte 3, bit [7]—EH) is interpreted as the eviction hint (EH) field 752B and the beta field 754 (EVEX byte 3, bits [6:4]—SSS) is interpreted as a three bit data manipulation field 754C.

When U=1, the alpha field 752 (EVEX byte 3, bit [7]—EH) is interpreted as the write mask control (Z) field 752C. When U=1 and the MOD field 842 contains 11 (signifying a no memory access operation), part of the beta field 754 (EVEX byte 3, bit [4]—$S_0$) is interpreted as the RL field 757A; when it contains a 1 (round 757A.1) the rest of the beta field 754 (EVEX byte 3, bit [6-5]—$S_{2-1}$) is interpreted as the round operation field 759A, while when the RL field 757A contains a 0 (VSIZE 757.A2) the rest of the beta field 754 (EVEX byte 3, bit [6-5]—$S_{2-1}$) is interpreted as the vector length field 759B (EVEX byte 3, bit [6-5]—$L_{1-0}$). When U=1 and the MOD field 842 contains 00, 01, or 10 (signifying a memory access operation), the beta field 754 (EVEX byte 3, bits [6:4]—SSS) is interpreted as the vector length field 759B (EVEX byte 3, bit [6-5]—$L_{1-0}$) and the broadcast field 757B (EVEX byte 3, bit [4]—B).

Exemplary Register Architecture

Figure 9:
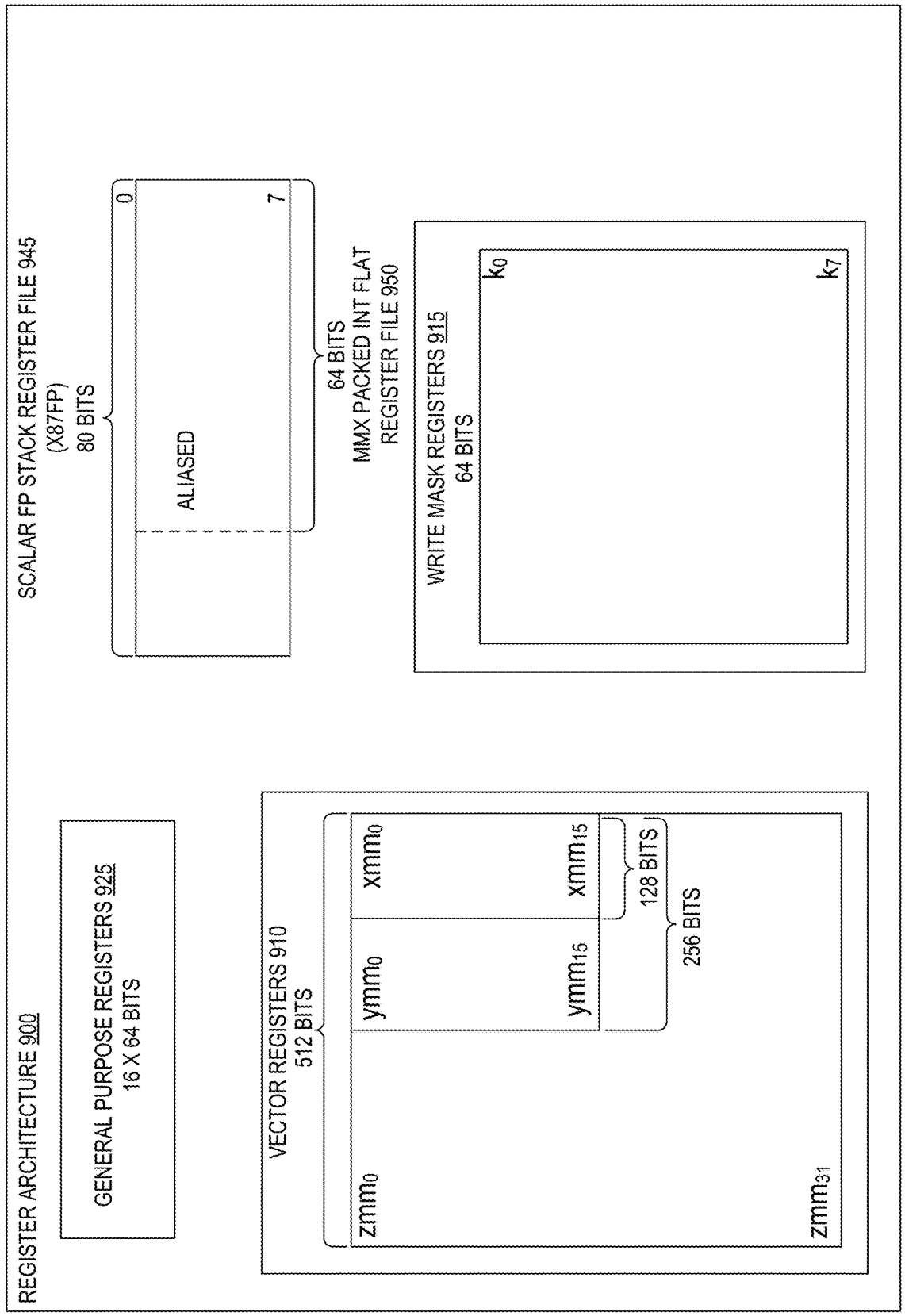
FIG. 9 is a block diagram of a register architecture according to one example of the disclosure

FIG. 9 is a block diagram of a register architecture 900 according to one example of the disclosure. In the example illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 800 operates on these overlaid register file as illustrated in the below tables.

| Adjustable Vector Length | Class | Operations | Registers |
|---|---|---|---|
| Instruction Templates that do not include the vector length field 759B | A (FIG. 7A; U = 0) | 710, 715, 725, 730 | zmm registers (the vector length is 64 byte) |
| | B (FIG. 7B; U = 1) | 712 | zmm registers (the vector length is 64 byte) |
| Instruction templates that do include the vector length field 759B | B (FIG. 7B; U = 1) | 717, 727 | zmm, ymm, or xmm registers (the vector length is 64 byte, 32 byte, or 16 byte) depending on the vector length field 759B |

In other words, the vector length field 759B selects between a maximum length and one or more other shorter lengths, where each such shorter length is half the length of the preceding length; and instructions templates without the vector length field 759B operate on the maximum vector length. Further, in one example, the class B instruction templates of the specific vector friendly instruction format 800 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the example.

Write mask registers 915—in the example illustrated, there are 8 write mask registers (k0 through k7), each 64 bits in size. In an alternate example, the write mask registers 915 are 16 bits in size. As previously described, in one example of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the example illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the example illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative examples of the disclosure may use wider or narrower registers. Additionally, alternative examples of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 10A is a block diagram illustrating both an exemplary in-order pipeline and an exemplary register renaming, out-of-order issue/execution pipeline according to examples of the disclosure. FIG. 10B is a block diagram illustrating both an exemplary example of an in-order architecture core and an exemplary register renaming, out-of-order issue/execution architecture core to be included in a processor according to examples of the disclosure. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front-end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front-end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder or decoder unit) may decode instructions (e.g., macro-instructions), and generate as an output one or more micro-operations, microcode entry points, micro-instructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one example, the core 1090 includes a microcode ROM or other medium that stores microcode for certain macro-instructions (e.g., in decode unit 1040 or otherwise within the front-end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one example, the physical register file(s) unit 1058 comprises a vector registers unit, a write mask registers unit, and a scalar registers unit. These register units may provide architectural vector registers, vector mask registers, and general-purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some examples may include a number of execution units dedicated to specific functions or sets of functions, other examples may include only one execution unit or multiple execution units that all perform all functions. The scheduler unit(s) 1056, physical register file(s) unit(s) 1058, and execution cluster(s) 1060 are shown as being possibly plural because certain examples create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain examples are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary example, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

In certain examples, a prefetch circuit 1078 is included to prefetch data, for example, to predict access addresses and bring the data for those addresses into a cache or caches (e.g., from memory 1080).

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one example, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated example of the processor also includes separate instruction and data cache units 1034/1074 and a shared L2 cache unit 1076, alternative examples may have a single internal cache for both instructions and data, such as, for example, a Level 1 (L1) internal cache, or multiple levels of internal cache. In some examples, the system may include a combination of an internal cache and an external cache that is external to the core and/or the processor. Alternatively, all of the cache may be external to the core and/or the processor.

Specific Exemplary In-Order Core Architecture

Figure 11B:
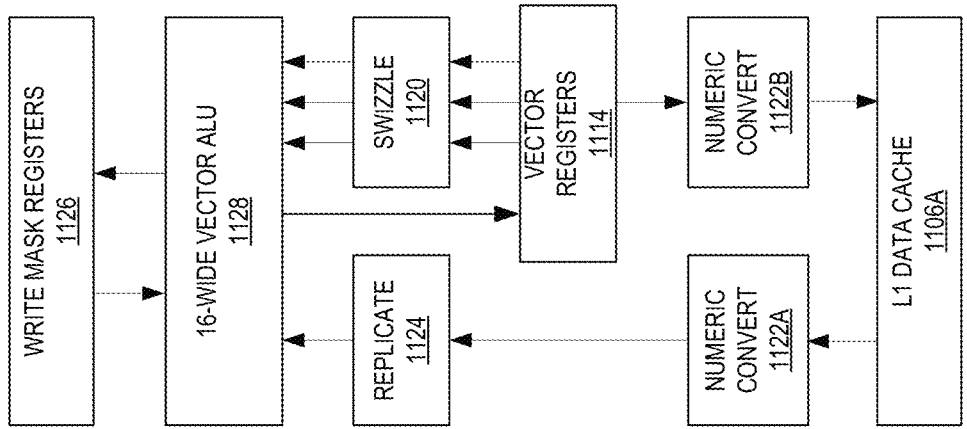
FIG. 11B is an expanded view of part of the processor core in FIG. 11A according to examples of the disclosure.
Figure 11A:
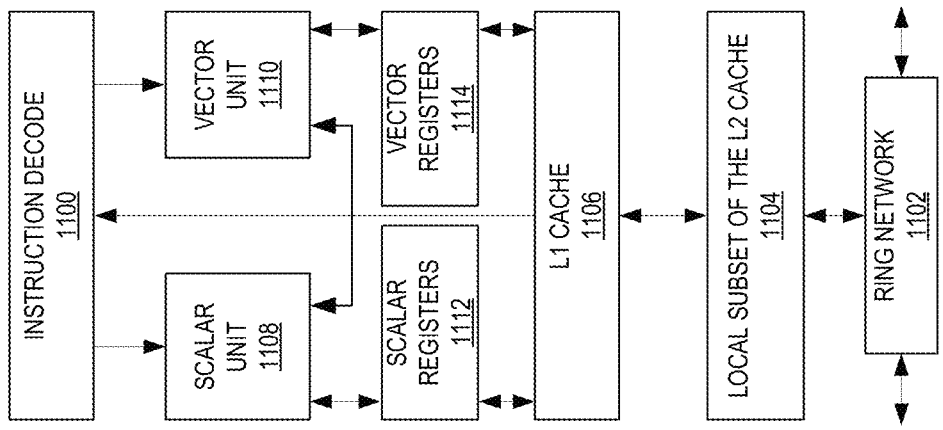
FIG. 11A is a block diagram of a single processor core, along with its connection to the on-die interconnect network and with its local subset of the Level 2 (L2) cache, according to examples of the disclosure.

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to examples of the disclosure. In one example, an instruction decode unit 1100 supports the x86 instruction set with a packed data instruction set extension. An L1 cache 1106 allows low-latency accesses to cache memory into the scalar and vector units. While in one example (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative examples of the disclosure may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to examples of the disclosure. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
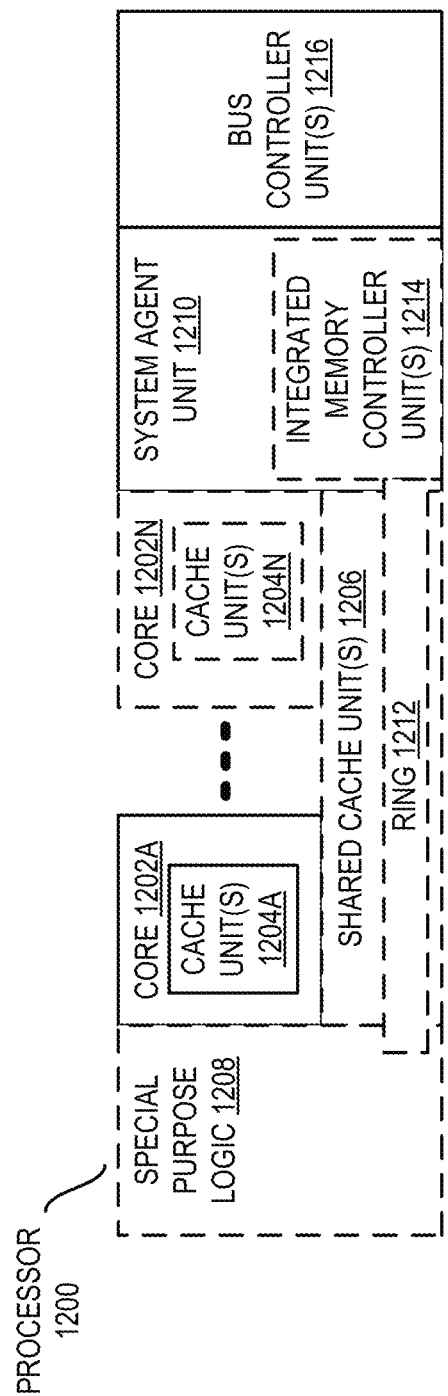
FIG. 12 is a block diagram of a processor that may have more than one core, may have an integrated memory controller, and may have integrated graphics according to examples of the disclosure.

FIG. 12 is a block diagram of a processor 1200 that may have more than one core, may have an integrated memory controller, and may have integrated graphics according to examples of the disclosure. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one example a ring-based interconnect unit 1212 interconnects the integrated graphics logic 1208, the set of shared cache units 1206, and the system agent unit 1210/integrated memory controller unit(s) 1214, alternative examples may use any number of well-known techniques for interconnecting such units. In one example, coherency is maintained between one or more cache units 1206 and cores 1202-A-N.

In some examples, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 13:
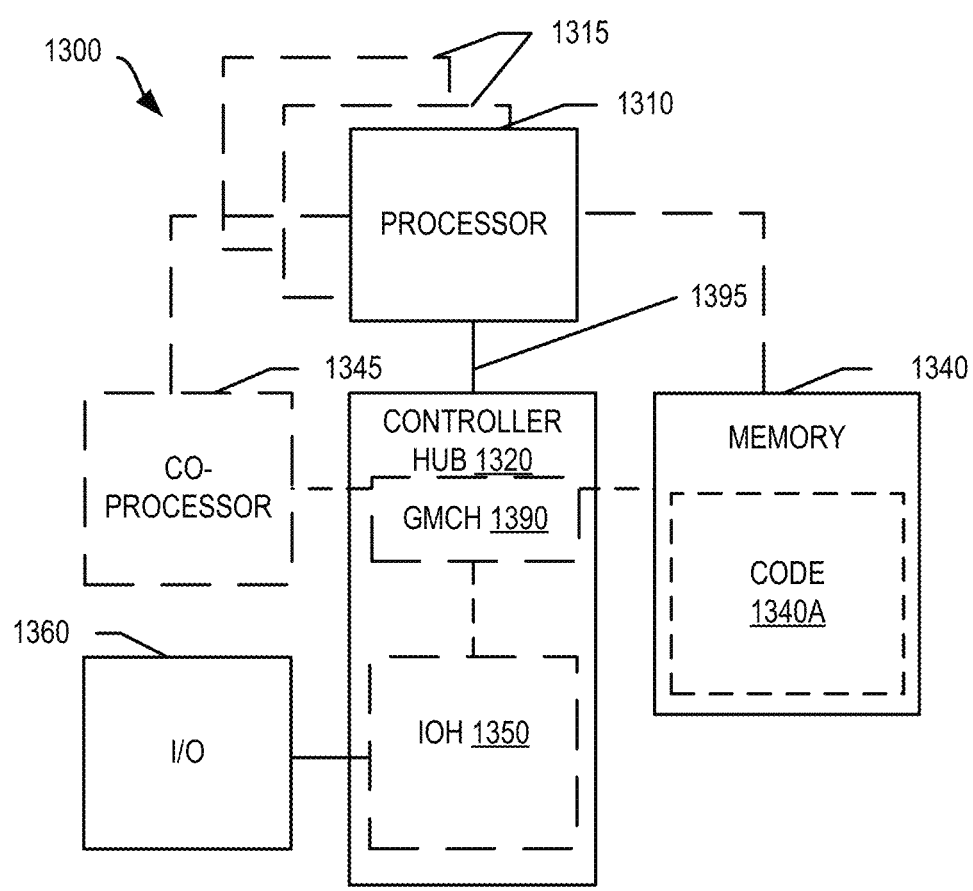
FIG. 13 is a block diagram of a system in accordance with one example of the present disclosure.

Referring now to FIG. 13, shown is a block diagram of a system 1300 in accordance with one example of the present disclosure. The system 1300 may include one or more processors 1310, 1315, which are coupled to a controller hub 1320. In one example the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350. Memory 1340 may include code 1340A, for example, that when executed causes a processor to perform any method of this disclosure.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random-access memory (DRAM), phase change memory (PCM), or a combination of the two. For at least one example, the controller hub 1320 communicates with the processor(s) 1310, 1315 via a multi-drop bus, such as a frontside bus (FSB), point-to-point interface such as QuickPath Interconnect (QPI), or similar connection 1395.

In one example, the coprocessor 1345 is a special-purpose processor, such as, for example, a high-throughput MIC processor, a network or communication processor, compression engine, graphics processor, GPGPU, embedded processor, or the like. In one example, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one example, the processor 1310 executes instructions that control data processing operations of a general type.

Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
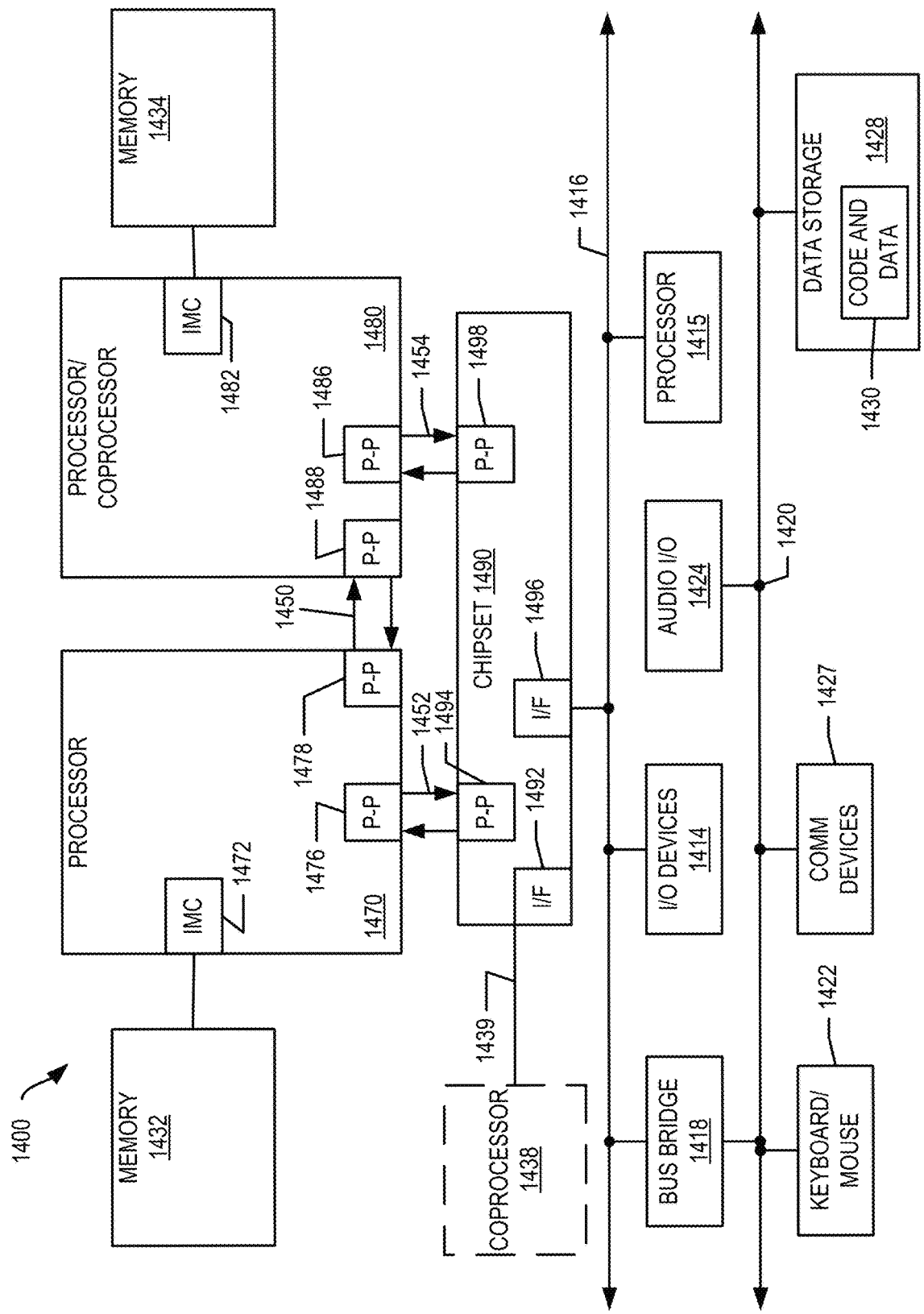
FIG. 14 is a block diagram of a more specific exemplary system in accordance with an example of the present disclosure.

Referring now to FIG. 14, shown is a block diagram of a first more specific exemplary system 1400 in accordance with an example of the present disclosure. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one example of the disclosure, processors 1470 and 1480 are respectively processors 1310 and 1315, while coprocessor 1438 is coprocessor 1345. In another example, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one example, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one example, first bus 1416 may be a Peripheral Component Interconnect (PCI) bus, or a bus such as a PCI Express bus or another third generation I/O interconnect bus, although the scope of the present disclosure is not so limited.

As shown in FIG. 14, various I/O devices 1414 may be coupled to first bus 1416, along with a bus bridge 1418 which couples first bus 1416 to a second bus 1420. In one example, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one example, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one example. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
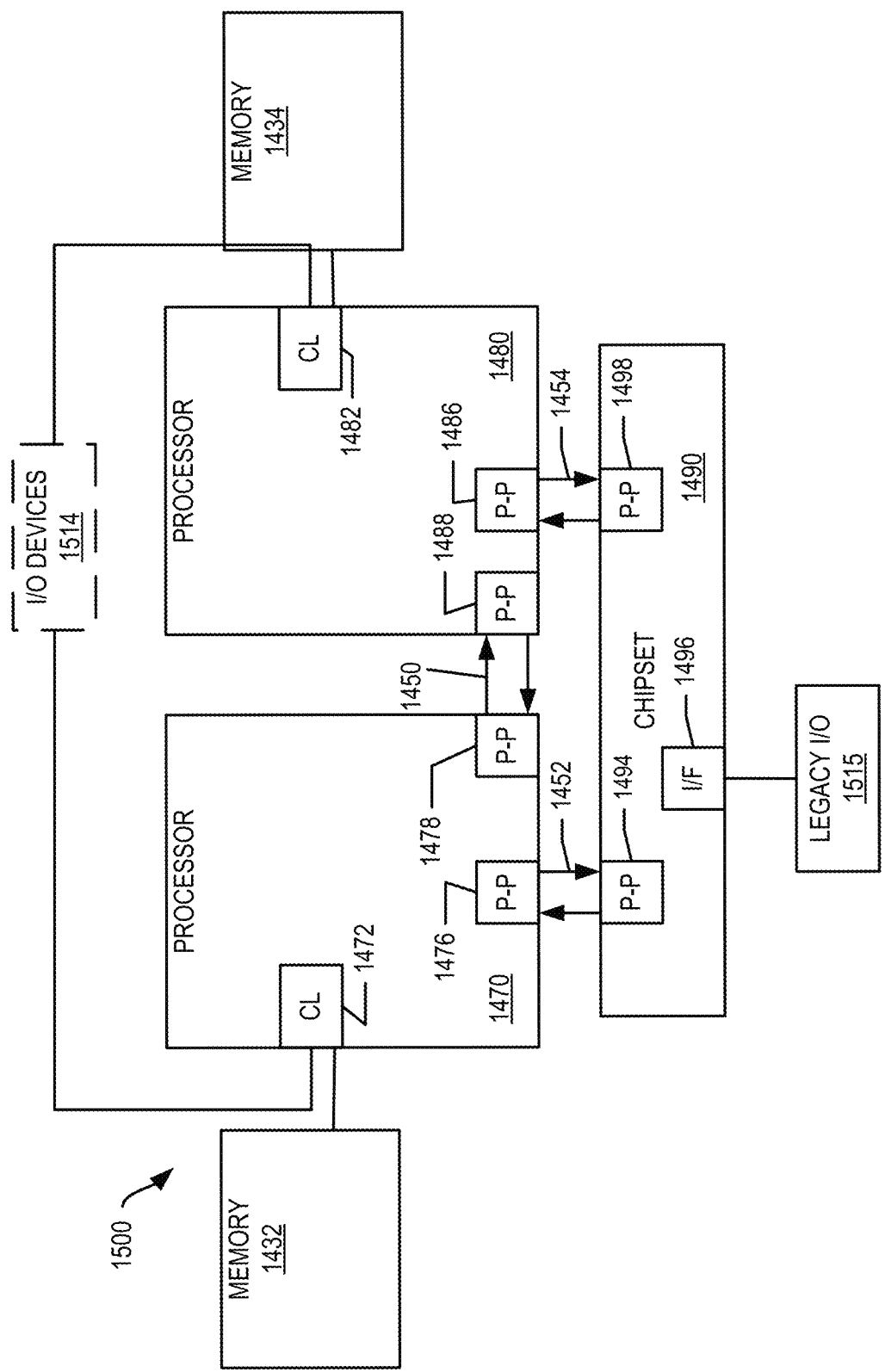
FIG. 15, shown is a block diagram of a second more specific exemplary system in accordance with an example of the present disclosure.

Referring now to FIG. 15, shown is a block diagram of a second more specific exemplary system 1500 in accordance with an example of the present disclosure. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
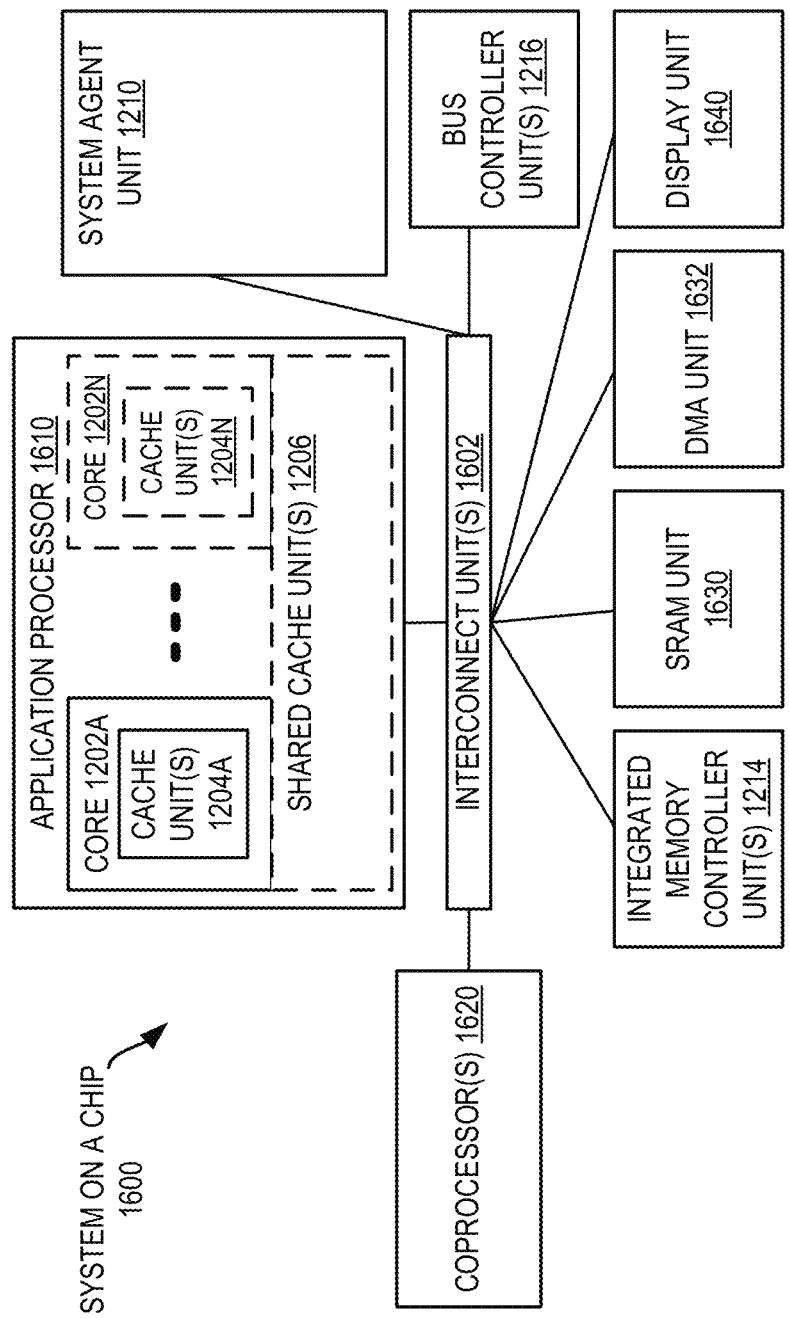
FIG. 16, shown is a block diagram of a system on a chip (SoC) in accordance with an example of the present disclosure.

Referring now to FIG. 16, shown is a block diagram of a SoC 1600 in accordance with an example of the present disclosure. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one example, the coprocessor(s) 1620 include a special-purpose processor, such as, for example, a network or communication processor, compression engine, GPGPU, a high-throughput MIC processor, embedded processor, or the like.

Examples (e.g., of the mechanisms) disclosed herein may be implemented in hardware, software, firmware, or a combination of such implementation approaches. Examples of the disclosure may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples of the disclosure also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
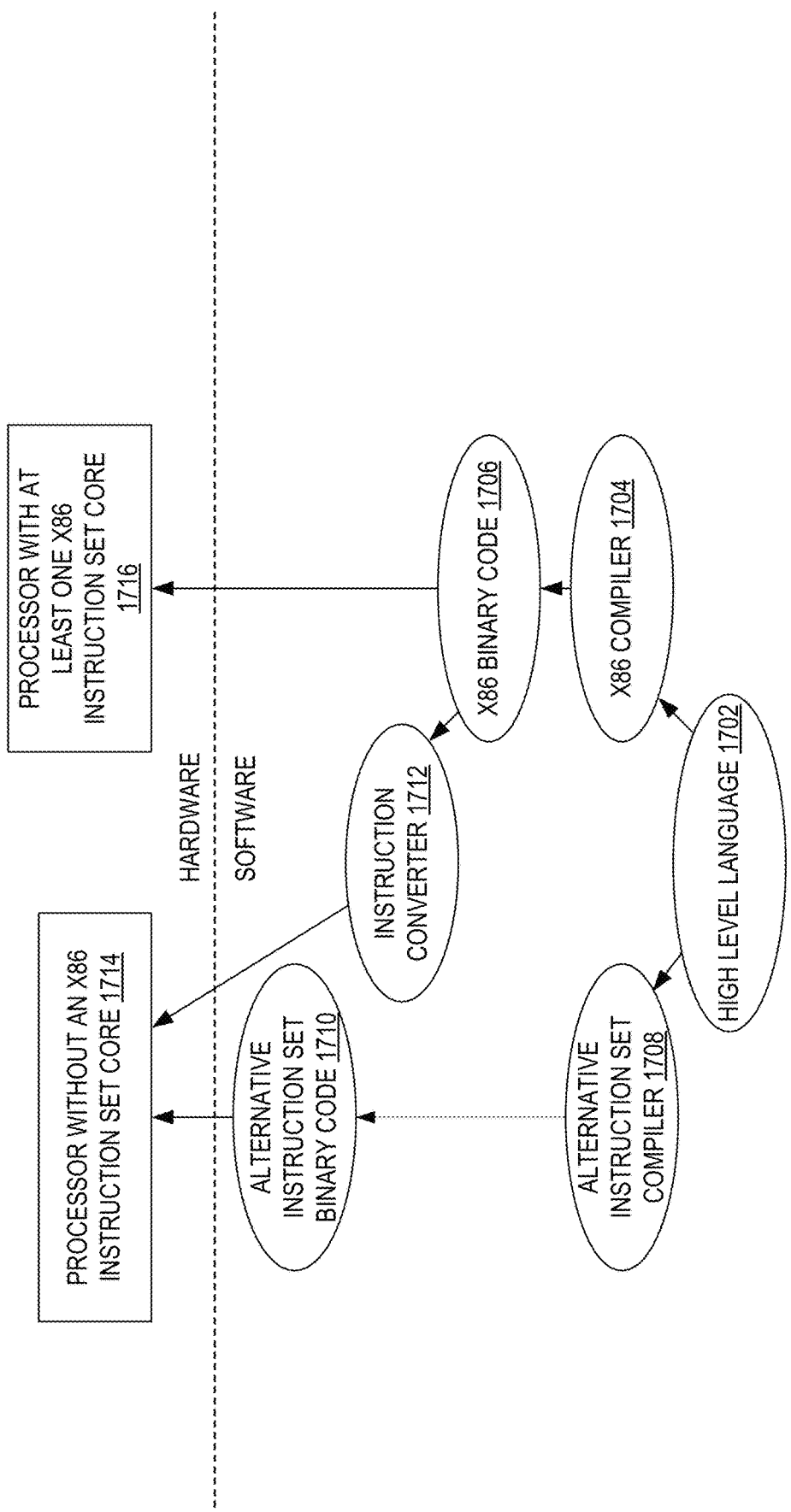
FIG. 17 is a block diagram contrasting the use of a software instruction converter to convert binary instructions in a source instruction set to binary instructions in a target instruction set according to examples of the disclosure.

FIG. 17 is a block diagram contrasting the use of a software instruction converter to convert binary instructions in a source instruction set to binary instructions in a target instruction set according to examples of the disclosure. In the illustrated example, the instruction converter is a software instruction converter, although alternatively the instruction converter may be implemented in software, firmware, hardware, or various combinations thereof. FIG. 17 shows a program in a high-level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation, or any other process, allows a processor or other electronic device that does not have an x86 instruction set processor or core to execute the x86 binary code 1706.

What is claimed is:

1. An apparatus comprising:
   a plurality of processor cores that are each coupled to a respective power management agent circuit;
   a cache shared by the plurality of processor cores; and
   a control register, that when set, causes:
      a save of a state of a first processor core of the plurality of processor cores to storage,
      a transfer of control of the first processor core to a power management agent circuit of the first processor core,
      isolation of the first processor core from the other of the plurality of processor cores by the power management agent circuit,
      performance of one or more functional tests from the cache on the first processor core caused by the power management agent circuit to generate a test result,
      removal of the isolation of the first processor core from the other of the plurality of processor cores by the power management agent circuit, and
      a transfer of the control by the power management agent circuit back to the first processor core.

2. The apparatus of claim 1, wherein, in response to the control register being set, an interrupt of the first processor core is denied and logged for subsequent handling.

3. The apparatus of claim 1, wherein the first processor core comprises:
   a decoder circuit to decode a single instruction into a decoded single instruction, the single instruction having fields that identify the one or more functional tests and the control register, and an opcode that indicates an execution circuit is to cause:
      the save of the state of the first processor core to the storage,
      the transfer of control of the first processor core to the power management agent circuit of the first processor core,
      the isolation of the first processor core from the other of the plurality of processor cores by the power management agent circuit, the performance of the one or more functional tests from the cache on the first processor core by the power management agent circuit to generate the test result, the removal of the isolation of the first processor core from the other of the plurality of processor cores by the power management agent circuit, and the transfer of the control by the power management agent circuit back to the first processor core; and the execution circuit to execute the decoded single instruction according to the opcode.

4. The apparatus of claim 1, wherein, in response to the control register being set, the power management agent circuit is to remove a reliability guard band of the first processor core.

5. The apparatus of claim 1, wherein the one or more functional tests include an instruction that causes a command to be sent to the power management agent circuit to cause the removal of the isolation and the transfer of the control by the power management agent circuit back to the first processor core.

6. The apparatus of claim 1, wherein the one or more functional tests include an instruction that causes a comparison of the test result to a collection of compressed logic traces to determine either of a pass indication and a fail indication for the first processor core.

7. The apparatus of claim 1, wherein the first processor core comprises a plurality of logical cores, and the performance of the one or more functional tests from the cache on the first processor core by the power management agent circuit is blocked when the plurality of logical cores do not request a same set of the one or more functional tests.

8. The apparatus of claim 1, wherein, in response to the performance of the one or more functional tests not being complete before reaching a timeout threshold, the power management agent circuit is to cause the removal of the isolation of the first processor core from the other of the plurality of processor cores, and the transfer of the control from the power management agent circuit back to the first processor core.

9. A method comprising:
setting a control register of a plurality of processor cores that are each coupled to a respective power management agent circuit and a cache shared by the plurality of processor cores; and
in response to the setting, causing:
a save of a state of a first processor core of the plurality of processor cores to storage,
a transfer of control of the first processor core to a power management agent circuit of the first processor core,
isolation of the first processor core from the other of the plurality of processor cores by the power management agent circuit,
performance of one or more functional tests from the cache on the first processor core caused by the power management agent circuit to generate a test result,
removal of the isolation of the first processor core from the other of the plurality of processor cores by the power management agent circuit, and
a transfer of the control by the power management agent circuit back to the first processor core.

10. The method of claim 9, further comprising, in response to the control register being set, denying an interrupt of the first processor core and logging the interrupt for subsequent handling.

11. The method of claim 9, further comprising:
decoding, by a decoder circuit of the first processor core, a single instruction into a decoded single instruction, the single instruction having fields that identify the one or more functional tests and the control register, and an opcode that indicates an execution circuit is to cause:
the save of the state of the first processor core to the storage,
the transfer of control of the first processor core to the power management agent circuit of the first processor core,
the isolation of the first processor core from the other of the plurality of processor cores by the power management agent circuit,
the performance of the one or more functional tests from the cache on the first processor core by the power management agent circuit to generate the test result,
the removal of the isolation of the first processor core from the other of the plurality of processor cores by the power management agent circuit, and
the transfer of the control by the power management agent circuit back to the first processor core; and
executing, by the execution circuit of the first processor core, the decoded single instruction according to the opcode.

12. The method of claim 9, further comprising removing a reliability guard band of the first processor core by the power management agent circuit in response to the control register being set.

13. The method of claim 9, wherein the one or more functional tests include an instruction that causes a command to be sent to the power management agent circuit to cause the removal of the isolation and the transfer of the control by the power management agent circuit back to the first processor core.

14. The method of claim 9, wherein the one or more functional tests include an instruction that causes a comparison of the test result to a collection of compressed logic traces to determine either of a pass indication and a fail indication for the first processor core.

15. The method of claim 9, wherein the first processor core comprises a plurality of logical cores, and the performance of the one or more functional tests from the cache on the first processor core by the power management agent circuit is blocked when the plurality of logical cores do not request a same set of the one or more functional tests.

16. The method of claim 9, further comprising, in response to the performance of the one or more functional tests not being complete before reaching a timeout threshold, causing the removal of the isolation of the first processor core from the other of the plurality of processor cores, and the transfer of the control from the power management agent circuit back to the first processor core.

17. A non-transitory machine readable medium that stores program code that when executed by a machine causes the machine to perform a method comprising:
setting a control register of a plurality of processor cores that are each coupled to a respective power management agent circuit and a cache shared by the plurality of processor cores; and
in response to the setting, causing:
a save of a state of a first processor core of the plurality of processor cores to storage,
a transfer of control of the first processor core to a power management agent circuit of the first processor core, isolation of the first processor core from the other of the plurality of processor cores by the power management agent circuit, performance of one or more functional tests from the cache on the first processor core caused by the power management agent circuit to generate a test result, removal of the isolation of the first processor core from the other of the plurality of processor cores by the power management agent circuit, and a transfer of the control by the power management agent circuit back to the first processor core.

18. The non-transitory machine readable medium of claim 17, wherein the method further comprises, in response to the control register being set, denying an interrupt of the first processor core and logging the interrupt for subsequent handling.

19. The non-transitory machine readable medium of claim 17, wherein the method further comprises:
decoding, by a decoder circuit of the first processor core, a single instruction into a decoded single instruction, the single instruction having fields that identify the one or more functional tests and the control register, and an opcode that indicates an execution circuit is to cause:
the save of the state of the first processor core to the storage,
the transfer of control of the first processor core to the power management agent circuit of the first processor core,
the isolation of the first processor core from the other of the plurality of processor cores by the power management agent circuit,
the performance of the one or more functional tests from the cache on the first processor core by the power management agent circuit to generate the test result,
the removal of the isolation of the first processor core from the other of the plurality of processor cores by the power management agent circuit, and
the transfer of the control by the power management agent circuit back to the first processor core; and
executing, by the execution circuit of the first processor core, the decoded single instruction according to the opcode.

20. The non-transitory machine readable medium of claim 17, wherein the method further comprises removing a reliability guard band of the first processor core by the power management agent circuit in response to the control register being set.

21. The non-transitory machine readable medium of claim 17, wherein the one or more functional tests include an instruction that causes a command to be sent to the power management agent circuit to cause the removal of the isolation and the transfer of the control by the power management agent circuit back to the first processor core.

22. The non-transitory machine readable medium of claim 17, wherein the one or more functional tests include an instruction that causes a comparison of the test result to a collection of compressed logic traces to determine either of a pass indication and a fail indication for the first processor core.

23. The non-transitory machine readable medium of claim 17, wherein the first processor core comprises a plurality of logical cores, and the performance of the one or more functional tests from the cache on the first processor core by the power management agent circuit is blocked when the plurality of logical cores do not request a same set of the one or more functional tests.

24. The non-transitory machine readable medium of claim 17, wherein the method further comprises, in response to the performance of the one or more functional tests not being complete before reaching a timeout threshold, causing the removal of the isolation of the first processor core from the other of the plurality of processor cores, and the transfer of the control from the power management agent circuit back to the first processor core.

* * * * *